United States Patent
Tonellato et al.

(10) Patent No.: US 10,429,132 B2
(45) Date of Patent: Oct. 1, 2019

(54) STACKED PLATE HEAT EXCHANGER WITH TOP AND BOTTOM MANIFOLDS

(71) Applicant: DANA CANADA CORPORATION, Oakville (CA)

(72) Inventors: Silvio Tonellato, Hamilton (CA); Michael Bardeleben, Oakville (CA); Sachin Bhatia, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 0 days.

(21) Appl. No.: 15/552,024

(22) PCT Filed: Feb. 17, 2016

(86) PCT No.: PCT/CA2016/050144
§ 371 (c)(1),
(2) Date: Aug. 18, 2017

(87) PCT Pub. No.: WO2016/131139
PCT Pub. Date: Aug. 25, 2016

(65) Prior Publication Data
US 2018/0038651 A1    Feb. 8, 2018

Related U.S. Application Data

(60) Provisional application No. 62/117,739, filed on Feb. 18, 2015.

(51) Int. Cl.
*F28D 1/03*        (2006.01)
*F28F 9/02*        (2006.01)
(Continued)

(52) U.S. Cl.
CPC .......... *F28D 1/0316* (2013.01); *B60K 11/00* (2013.01); *B60K 11/04* (2013.01); *F28D 1/0333* (2013.01);
(Continued)

(58) Field of Classification Search
CPC .... F28D 1/0316; F28D 1/0325; F28D 1/0333; F28F 9/0209; F28F 9/0221
(Continued)

(56) References Cited

U.S. PATENT DOCUMENTS 1,472,158 A * 10/1923 Fallier .................. F28D 1/0316
165/151
1,739,671 A * 12/1929 Higgins ................. F28F 3/086
165/148
(Continued)

FOREIGN PATENT DOCUMENTS

CA      1305698       12/1987
CN    103733012 A     4/2014
(Continued)

OTHER PUBLICATIONS

Karmazin Products Corporation Brochure, pp. 6-7 (1981).
(Continued)

*Primary Examiner* — Leonard R Leo
(74) *Attorney, Agent, or Firm* — Marshall & Melhorn, LLC

(57) ABSTRACT

A heat exchanger has a core comprised of at least one core section defined by a plate stack comprising a plurality of core plates, each core plate having a plurality of spaced apart, raised openings surrounded by a flat area. The raised openings of adjacent plates are sealed together to define a plurality of tubular structures. Top and bottom manifolds are sealed to the top and bottom of the core, with continuous top and bottom end plates providing structurally rigid connections between multiple core sections of the heat exchanger. The heat exchanger may have numerous configurations, including stepped core, curved core, angled core, and/or a
(Continued)

core having multiple sections of the same or different length, while minimizing the number of unique parts and/or parts of complex shape.

24 Claims, 17 Drawing Sheets

(51) Int. Cl.
  *B60K 11/00* (2006.01)
  *B60K 11/04* (2006.01)
  *F28D 1/02* (2006.01)
  *F28D 21/00* (2006.01)
(52) U.S. Cl.
  CPC .......... *F28F 9/0221* (2013.01); *F28F 9/0256* (2013.01); *F28F 9/0278* (2013.01); *F28D 1/0325* (2013.01); *F28D 2001/0273* (2013.01); *F28D 2021/008* (2013.01); *F28D 2021/0089* (2013.01); *F28F 9/0209* (2013.01)
(58) Field of Classification Search
  USPC .......................... 165/144, 145, 148, 151, 175
  See application file for complete search history.

(56) References Cited

U.S. PATENT DOCUMENTS

| | | | | |
|---|---|---|---|---|
| 1,935,332 | A * | 11/1933 | Quarnstrom | F28F 1/28 165/151 |
| 1,999,246 | A | 4/1935 | Maret | |
| 2,028,456 | A * | 1/1936 | Karmazin | F25B 39/04 165/150 |
| 2,081,303 | A | 5/1937 | Karmazin | |
| 2,111,534 | A * | 3/1938 | Karmazin | F28F 3/086 165/151 |
| 2,179,703 | A * | 11/1939 | Saunders | F28F 9/0243 165/151 |
| 2,212,242 | A * | 8/1940 | Nemmer | F28F 1/28 165/151 |
| 2,308,119 | A * | 1/1943 | Spieth | F28D 1/0535 165/144 |
| 2,984,456 | A * | 5/1961 | Young | F28D 1/02 138/37 |
| 3,280,905 | A * | 10/1966 | Costes | F22B 1/023 122/510 |
| 3,376,917 | A * | 4/1968 | Smith | F25B 39/04 165/111 |
| 3,601,878 | A | 8/1971 | Karmazin | |
| 3,650,321 | A | 3/1972 | Kaltz | |
| 3,865,185 | A | 2/1975 | Ostbo | |
| 4,141,409 | A | 2/1979 | Woodhull, Jr. et al. | |
| 4,191,244 | A | 3/1980 | Keske | |
| 4,340,114 | A * | 7/1982 | Levy | F25B 39/00 165/110 |
| 4,381,033 | A | 4/1983 | Woodhull, Jr. et al. | |
| 4,429,738 | A | 2/1984 | Woodhull, Jr. et al. | |
| 4,509,672 | A | 4/1985 | Woodhull, Jr. et al. | |
| 4,673,032 | A * | 6/1987 | Hara | F01P 11/10 165/144 |
| 4,771,942 | A * | 9/1988 | Arold | F28D 1/0417 165/144 |
| 4,936,379 | A | 6/1990 | Hoshino et al. | |
| 5,042,577 | A | 8/1991 | Suzumura | |
| 5,236,336 | A | 8/1993 | Hitoshi | |
| 5,355,947 | A | 10/1994 | Rasso, Jr. et al. | |
| 5,538,077 | A * | 7/1996 | So | F28D 9/0043 165/109.1 |
| 5,553,664 | A | 9/1996 | Nishishita et al. | |
| 5,826,648 | A * | 10/1998 | Shimoya | F28D 1/0333 165/153 |
| 7,000,690 | B2 | 2/2006 | Auchter et al. | |
| 7,337,833 | B2 | 3/2008 | Laveran et al. | |
| 7,568,520 | B2 | 8/2009 | Ozawa et al. | |
| 7,975,479 | B2 * | 7/2011 | Altin | F28F 9/26 165/144 |
| 8,091,620 | B2 | 1/2012 | Gorbounov et al. | |
| 8,631,859 | B1 * | 1/2014 | Hettrich | F28F 9/0226 165/144 |
| 9,250,019 | B2 | 2/2016 | Han et al. | |
| 2003/0150603 | A1 | 8/2003 | Auchter et al. | |
| 2011/0011568 | A1 | 1/2011 | Han et al. | |
| 2011/0303402 | A1 | 12/2011 | Gu et al. | |
| 2012/0118548 | A1 | 5/2012 | Han et al. | |
| 2014/0116672 | A1 | 5/2014 | Martin et al. | |
| 2014/0290922 | A1 | 10/2014 | Palanchon | |
| 2014/0305621 | A1 | 10/2014 | Gaiser | |

FOREIGN PATENT DOCUMENTS

| | | |
|---|---|---|
| EP | 0274695 A1 | 7/1988 |
| JP | S5534471 Y2 | 8/1980 |
| JP | S5731797 A | 2/1982 |
| JP | 5-60483 | 3/1993 |
| JP | 2005201471 A | 7/2005 |
| WO | 79/00605 A1 | 8/1979 |

OTHER PUBLICATIONS

Machine-generated English Translation of JP 5-60483, obtained via Espacenet Patent Search.
Canadian Intellectual Property Office, International Search Report with Written Opinion, issued in PCT/CA2016/050144, dated Apr. 19, 2016, 7 pages, Canadian Intellectual Property Office, Gatineau, Quebec, Canada.
China National Intellectual Property Administration, Office Action in Application No. 201680020864.7, dated Oct. 31 2018, 5 pages.

* cited by examiner

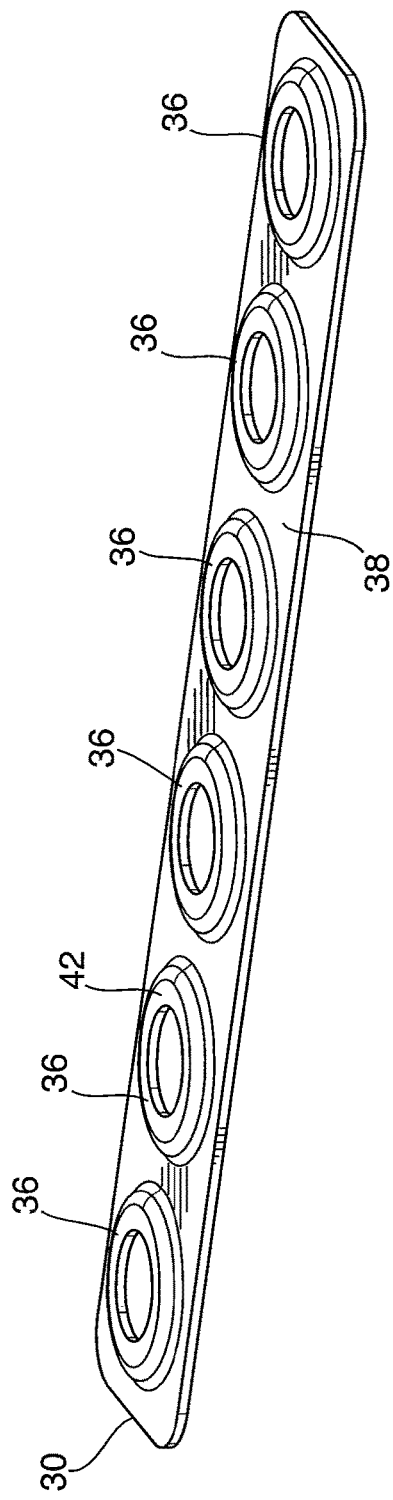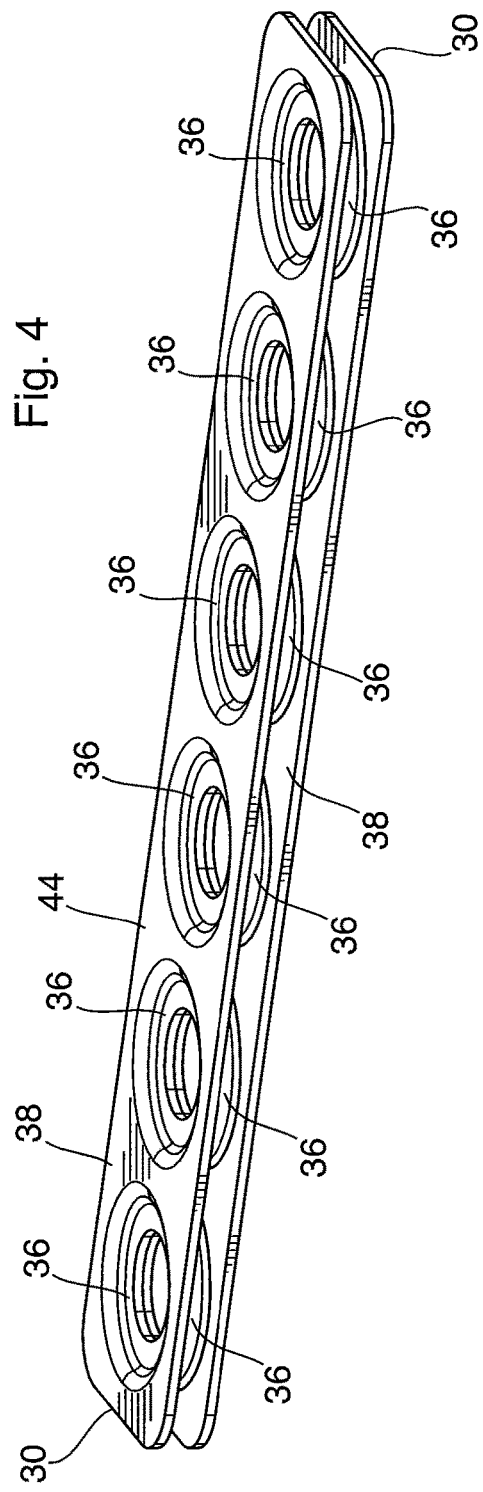

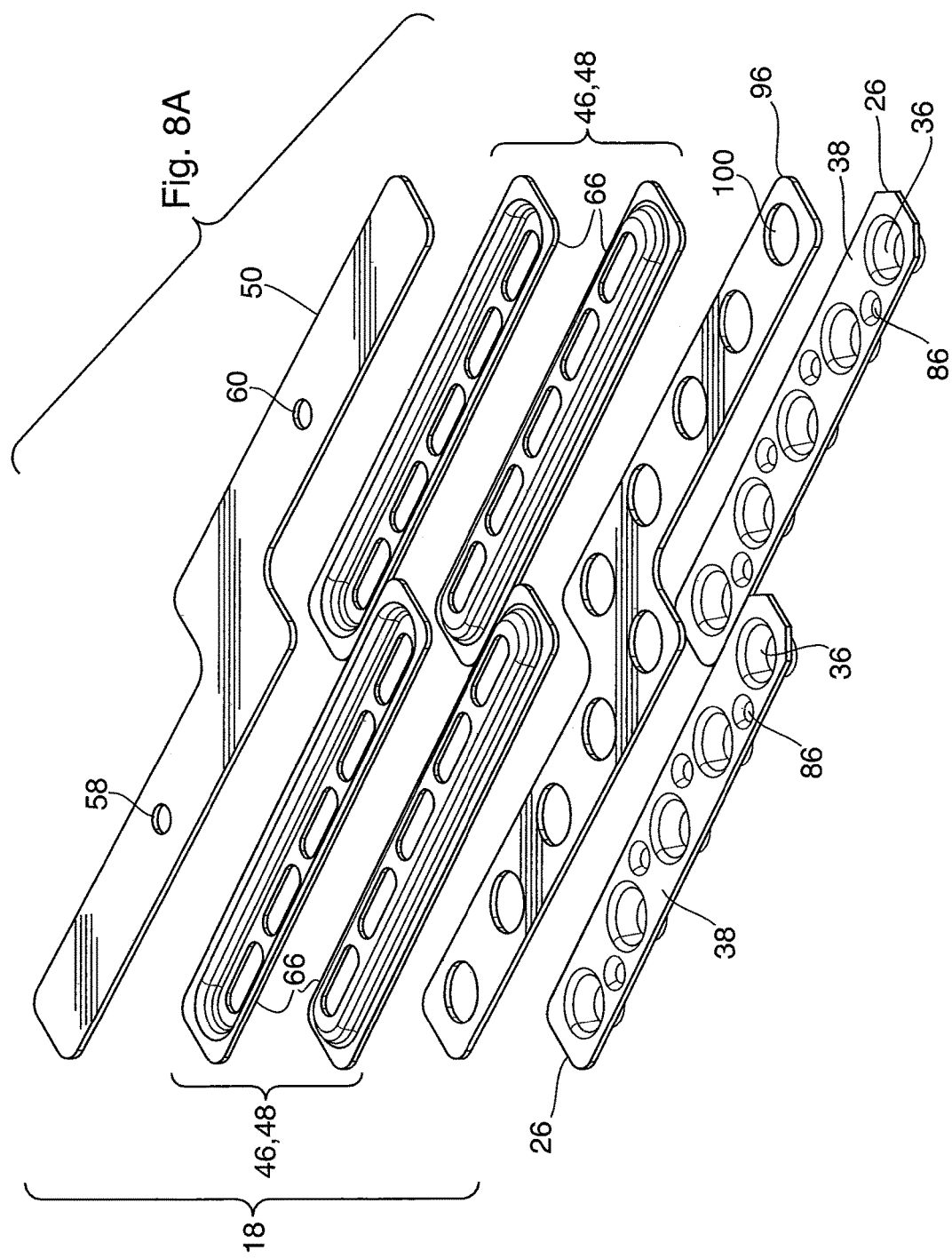

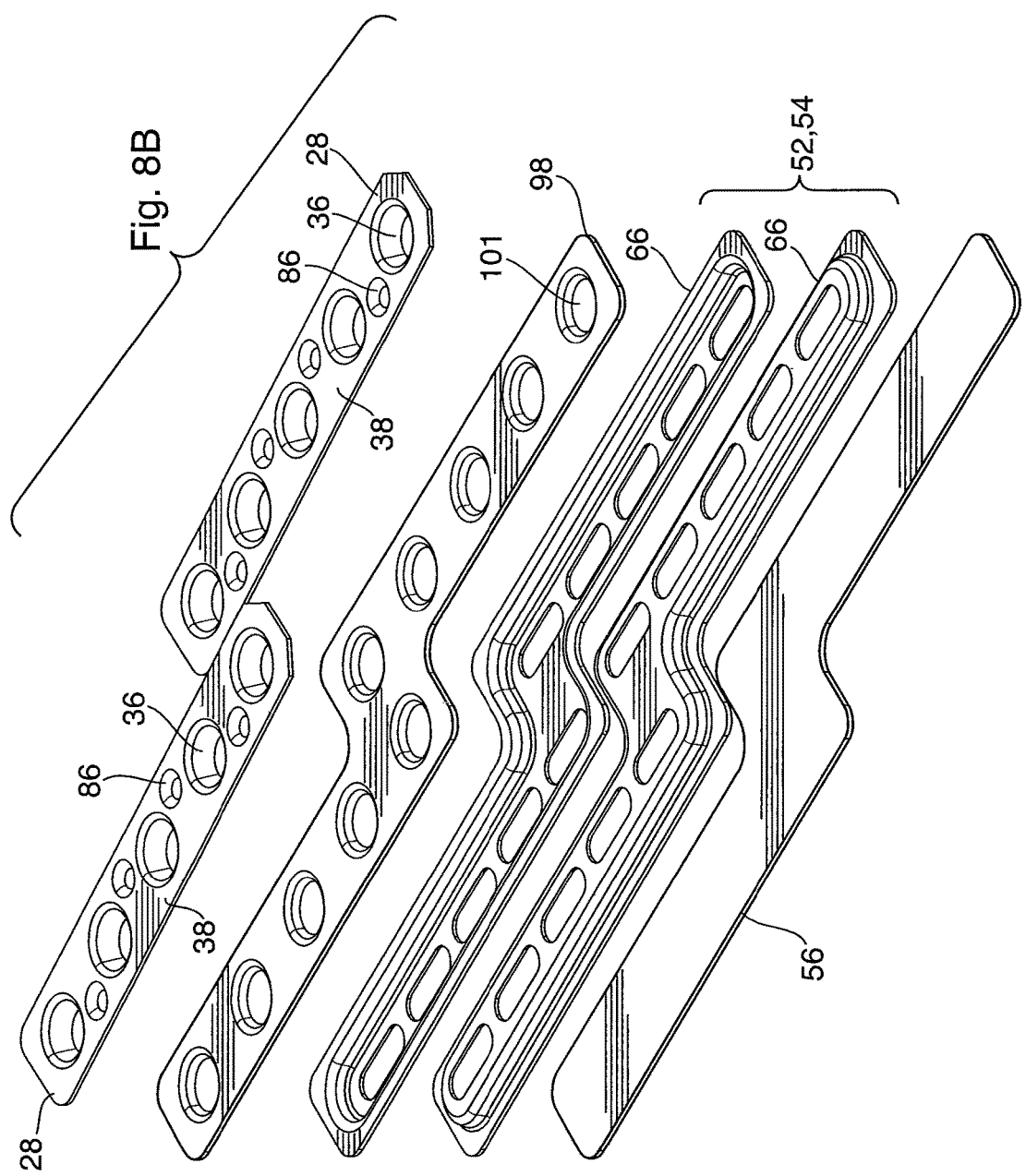

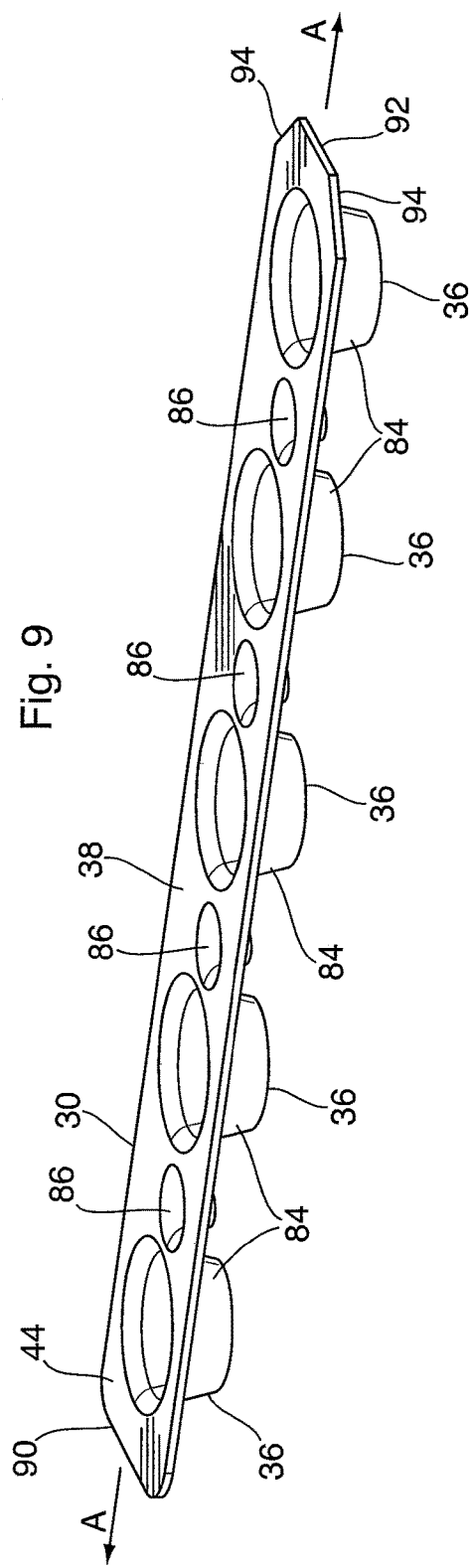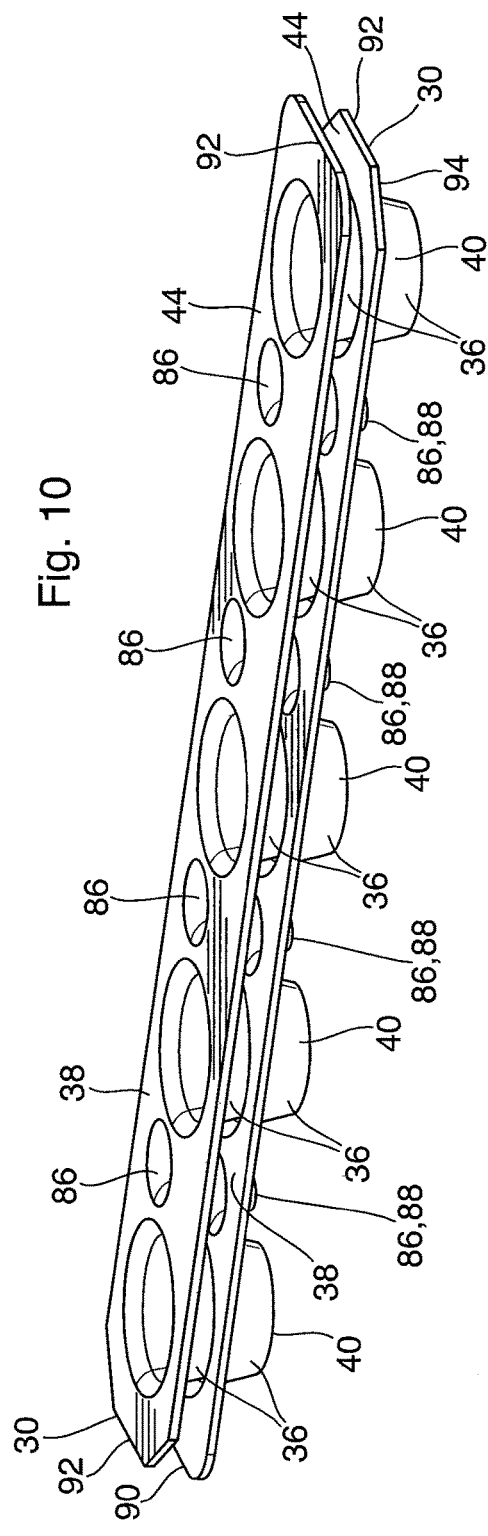

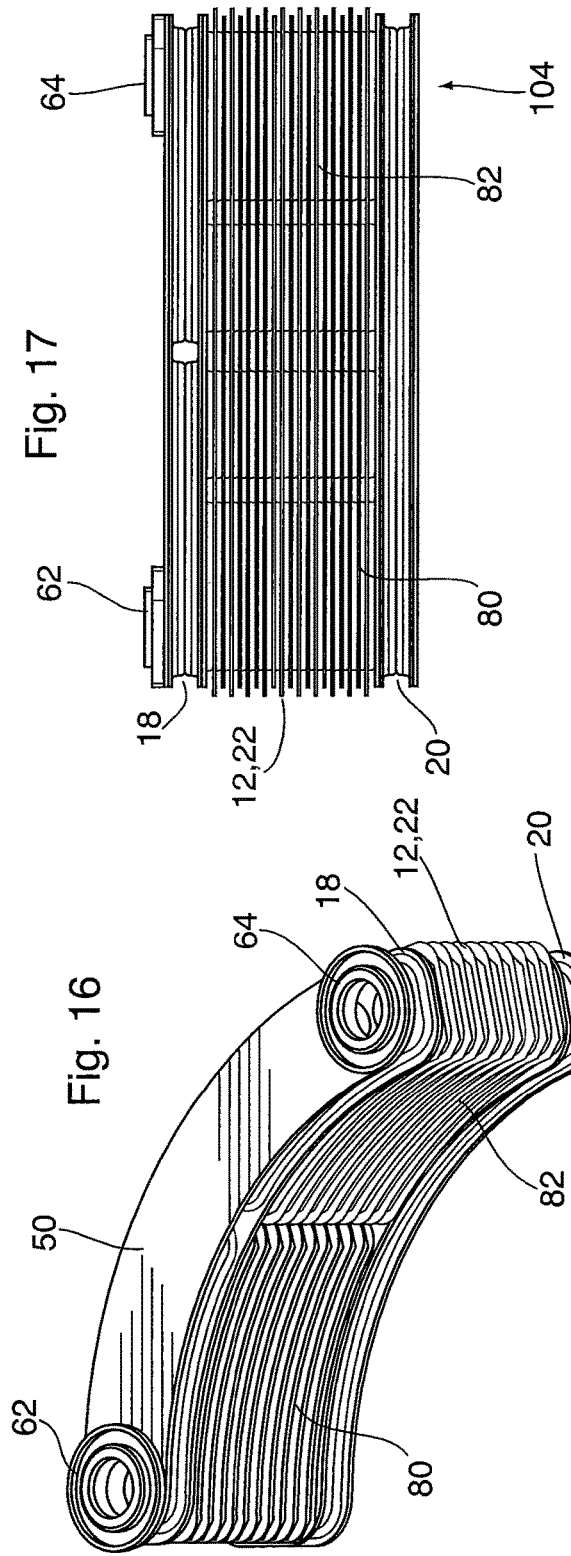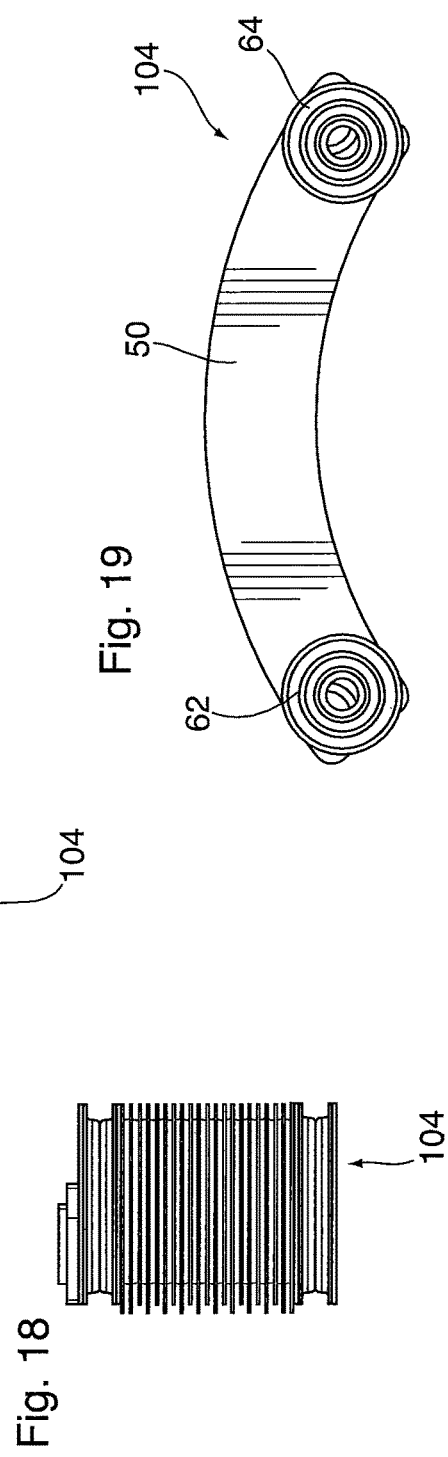

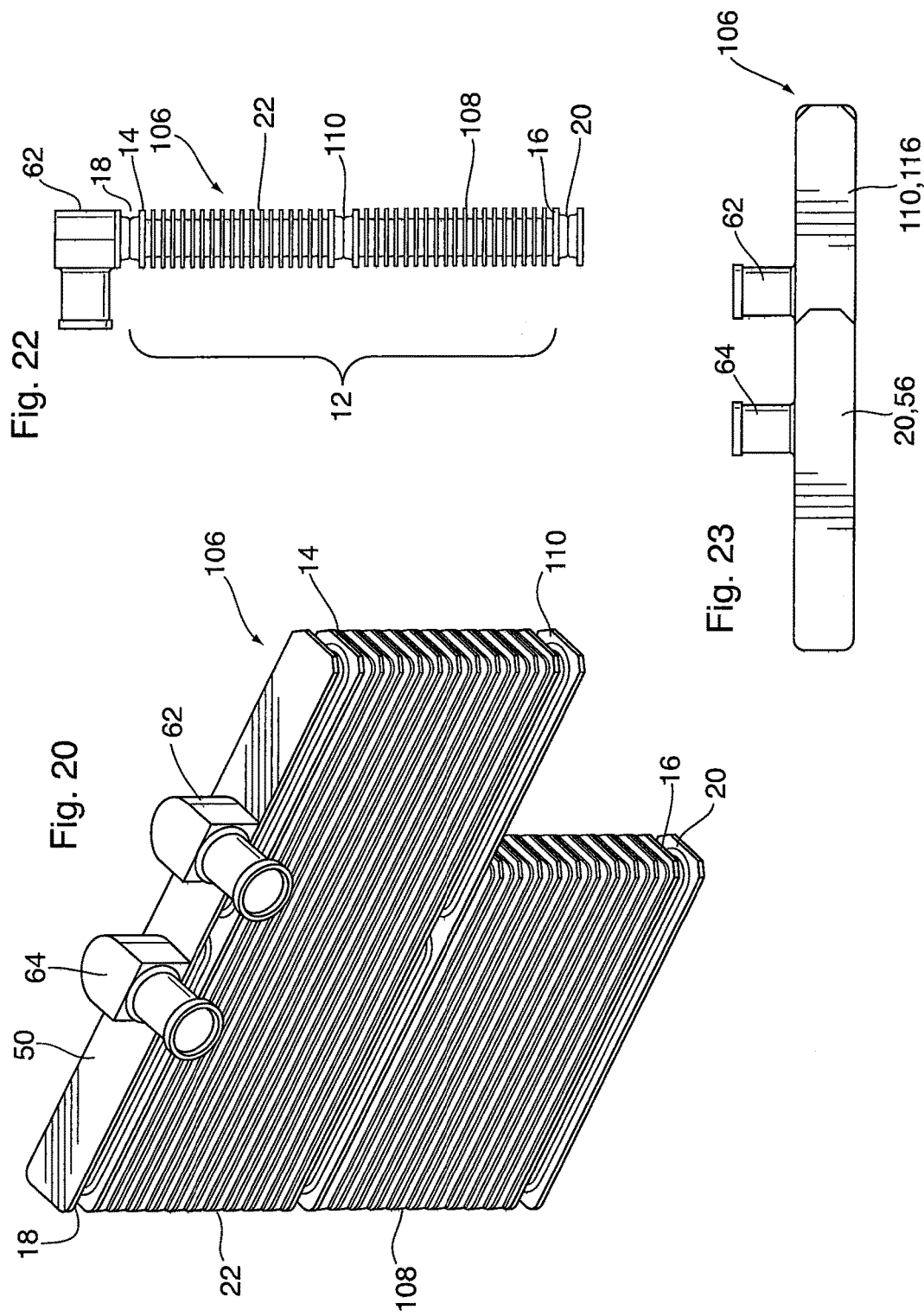

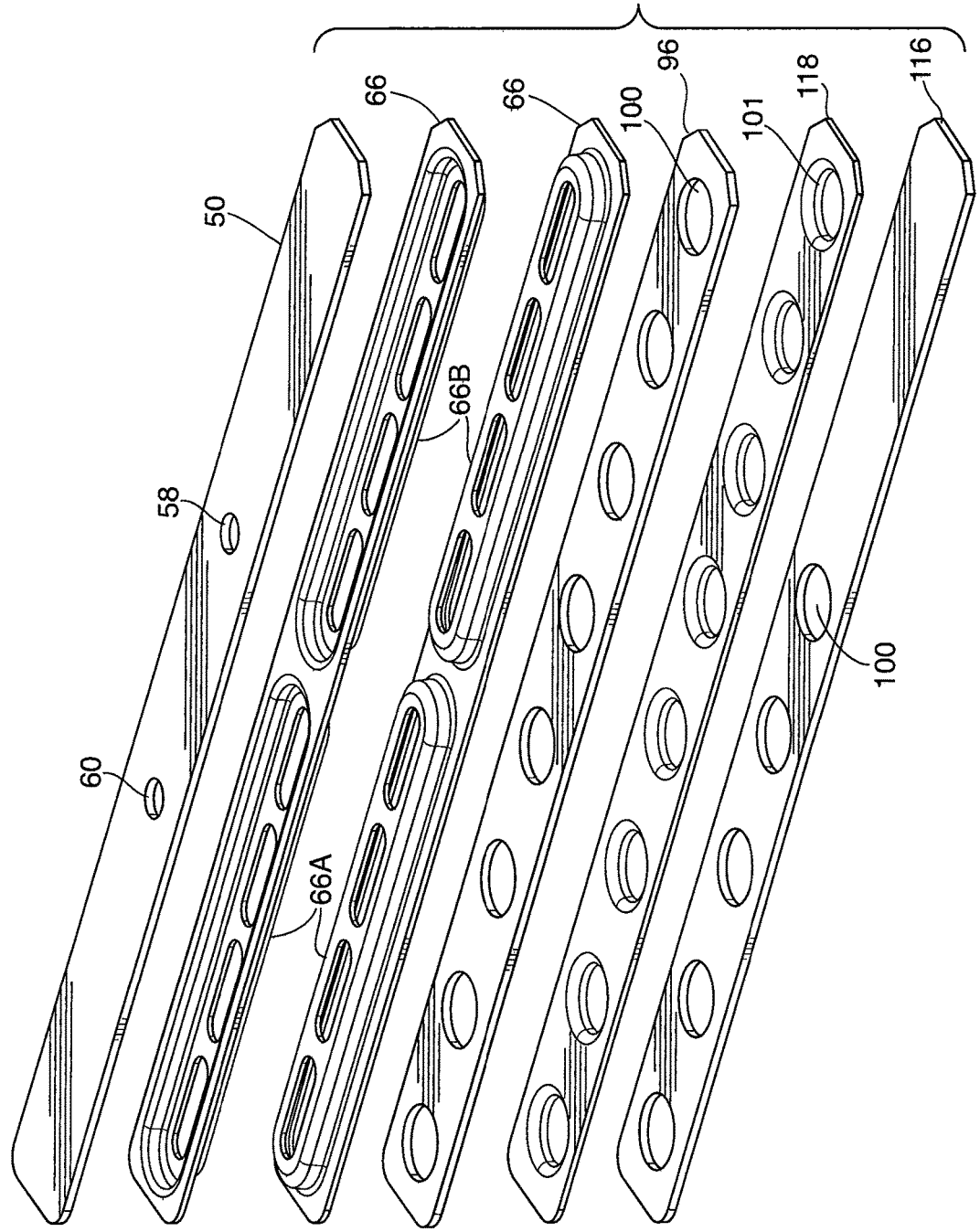

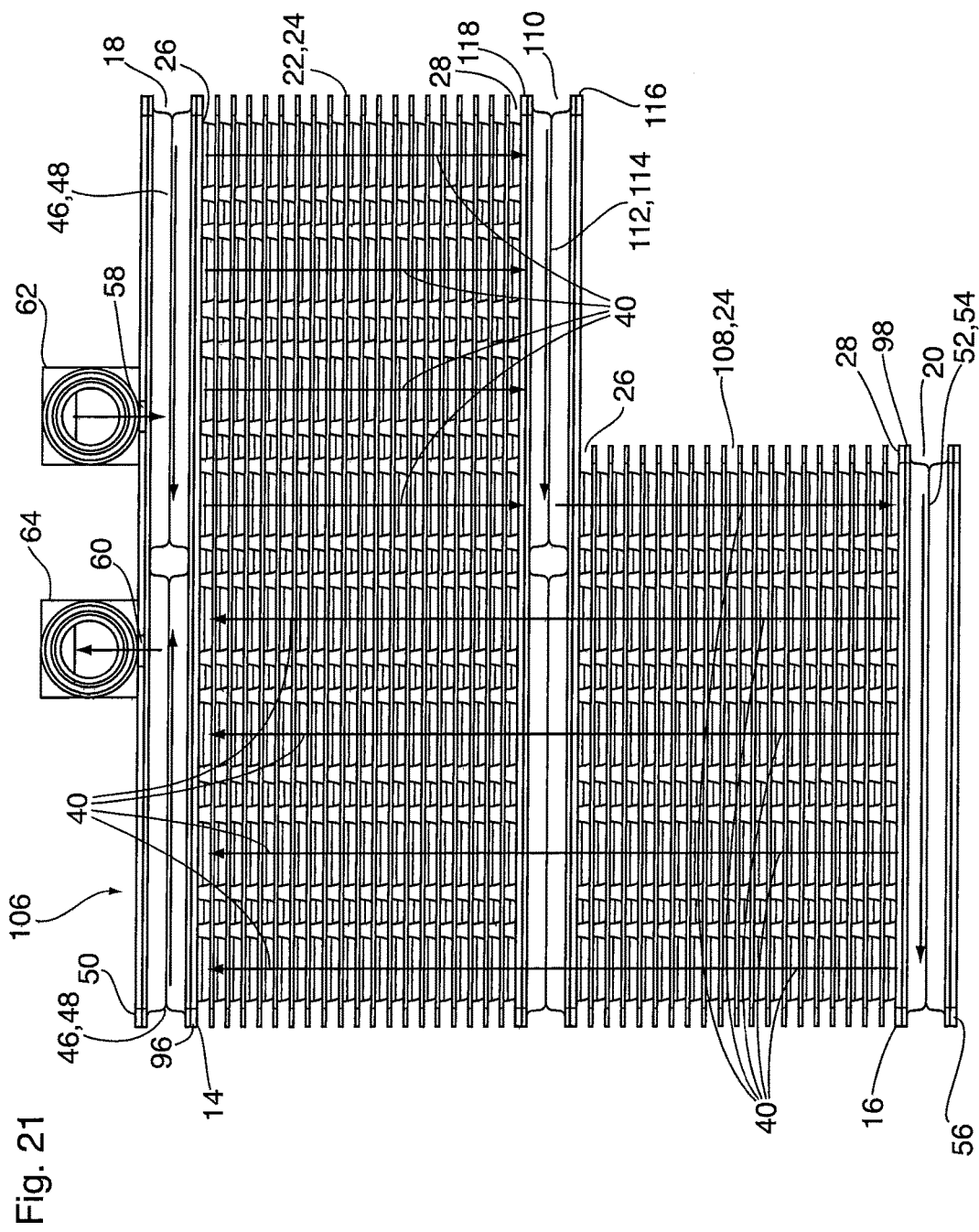

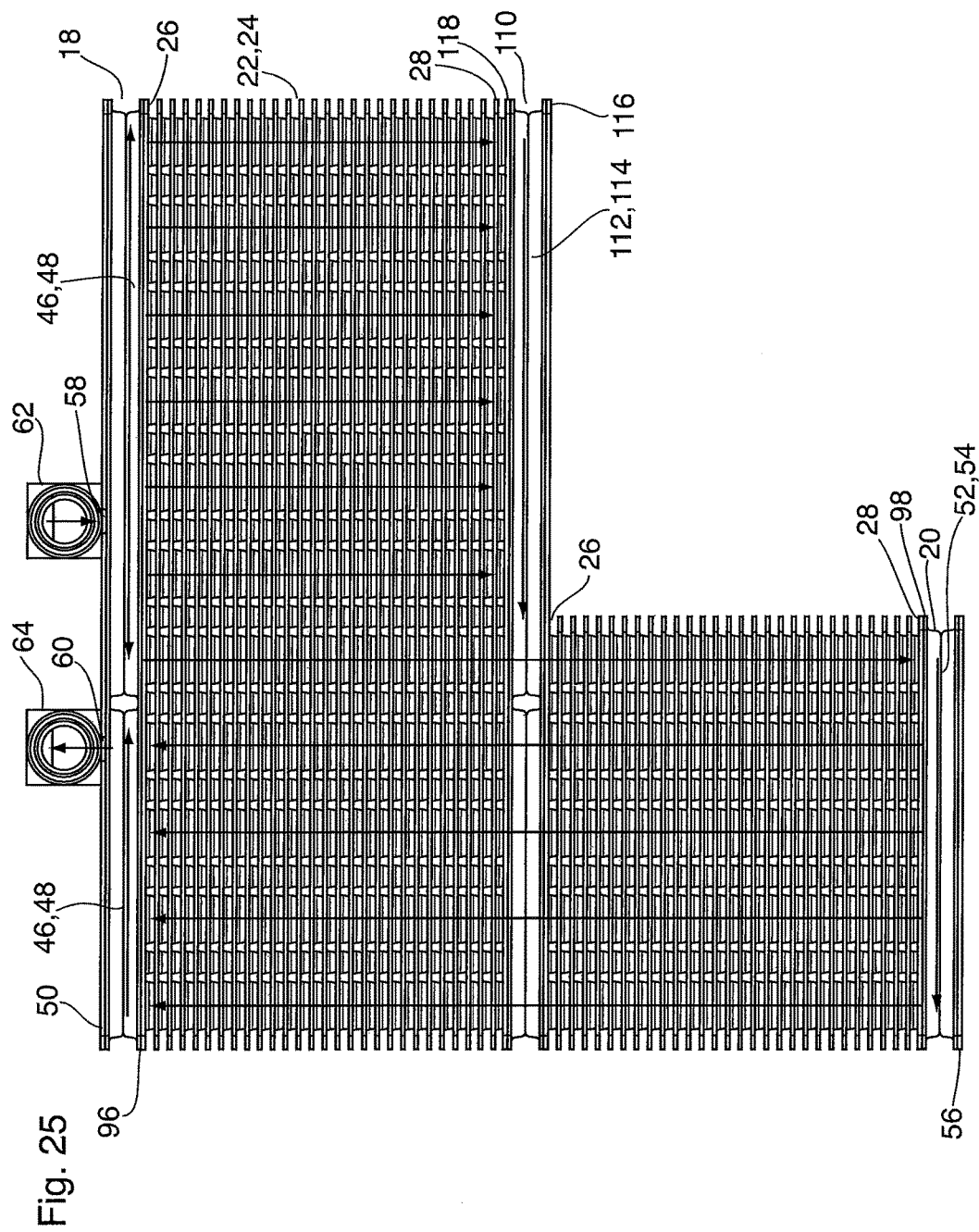

STACKED PLATE HEAT EXCHANGER WITH TOP AND BOTTOM MANIFOLDS

CROSS-REFERENCE TO RELATED APPLICATION

This application claims priority to and the benefit of U.S. Provisional Patent Application No. 62/117,739 filed Feb. 18, 2015, the contents of which are incorporated herein by reference.

FIELD OF THE INVENTION

The invention generally relates to an improved construction of heat exchangers for heating and/or cooling liquids, and particularly to heat exchangers for use in vehicle systems which are easily adaptable to various configurations, inexpensive to manufacture, reliable, and which use a minimum number of unique parts.

BACKGROUND OF THE INVENTION

Heat exchangers for vehicle systems must be lightweight, strong, reliable, inexpensive to manufacture, and must fit within confined spaces. For example, so-called "in-tank" heat exchangers for heating and/or cooling various liquids within a vehicle system must fit within the confines of a reservoir for the liquid being heated or cooled, while maximizing heat exchange with the liquid within the reservoir. Examples of liquids which may be heated and/or cooled by in-tank heat exchangers include engine oil, transmission oil, axle oil, power steering fluid, and liquid fuel.

As an example, in-tank heat exchangers for heating and/or cooling engine oil are typically located inside an oil pan which is bolted to the underside of an engine block. Oil pans typically have a shallow region and a deeper sump. In order to maximize heat transfer within this space, the heat exchanger may require a shape which is non-planar and/or non-rectangular. Manufacturing such a heat exchanger with a conventional tube and fin construction, with or without header tanks, can be expensive and difficult, at least partly due to the number of unique components required. Furthermore, the conventional tube-and-fin construction tends to be application specific and is difficult to adapt to different types and shapes of oil pans.

There remains a need for an improved construction of heat exchangers for vehicle systems which are easily adapted to various configurations, inexpensive to manufacture, reliable, and which use a minimum number of unique parts, without sacrificing simplicity, manufacturability and reliability.

SUMMARY OF THE INVENTION

In one aspect, there is provided a heat exchanger comprising a core, a top manifold and a bottom manifold. The core has a height, a length, and a top and a bottom between which the height is defined. The core comprises at least one core section having a top, a bottom and a length.

Each core section comprises:
 (i) a plate stack comprising a plurality of core plates, wherein the plate stack has a top and a bottom, and wherein each of the core plates comprises a generally flat plate having a plurality of spaced apart, raised openings provided along its length, and a flat area surrounding said plurality of raised openings, wherein the raised openings of adjacent core plates in said plate stack are sealed together to define a plurality of tubular structures extending between the top and the bottom of the plate stack;
 (ii) a top plate sealed to the top of the plate stack, the top plate having one or more openings communicating with the plurality of tubular structures; and
 (iii) a bottom plate sealed to the bottom of the plate stack, the bottom plate having one or more openings communicating with the plurality of tubular structures.

The top manifold is provided on and sealed to the top of the core, and comprises:
 (i) at least one top manifold tank section having an interior defining a top manifold tank space, wherein the top manifold tank space of each said top manifold tank section is in flow communication with at least one of the tubular structures of one of the at least one core sections; and
 (ii) a top manifold end plate provided on the top manifold tank section and at least partly sealing the top manifold tank space, wherein the top manifold end plate extends throughout the length of the core at the top thereof.

The bottom manifold is provided on and sealed to the bottom of the core, and comprises:
 (i) at least one bottom manifold tank section having an interior defining a bottom manifold tank space, wherein the bottom manifold tank space of each said bottom manifold tank is in flow communication with at least one of the tubular structures of one of the at least one core sections; and
 (ii) a bottom manifold end plate provided on the bottom manifold tank section and at least partly sealing the bottom manifold tank space, wherein the bottom manifold end plate extends throughout the length of the core at the bottom thereof.

BRIEF DESCRIPTION OF THE DRAWINGS

The embodiments will now be described, by way of example only, with reference to the accompanying drawings in which:

FIG. 3 is a top perspective view of a core plate of the heat exchanger of FIG. 1;

FIG. 4 is a top perspective view of an adjacent pair of core plates of the heat exchanger of FIG. 1;

FIG. 8A is an exploded perspective view of the top manifold of the heat exchanger of FIG. 7;

FIG. 8B is an exploded perspective view of the bottom manifold of the heat exchanger of FIG. 7;

FIG. 9 is a top perspective view of a core plate of the heat exchanger of FIGS. 8A and 8B;

FIG. 10 is a top perspective view of an adjacent pair of core plates of the heat exchanger of FIGS. 8A and 8B;

FIG. 16 is a top perspective view of a heat exchanger according to a fourth embodiment;

FIG. 17 is a front elevation view of the heat exchanger of FIG. 11;

FIG. 18 is a side elevation view of the heat exchanger of FIG. 11;

FIG. 19 is a top plan view of the heat exchanger of FIG. 11;

FIG. 20 is a top perspective view of a heat exchanger according to a fifth embodiment;

FIG. 20A illustrates a number of components of the top manifold and intermediate manifold of the heat exchanger of FIG. 20;

FIG. 21 is a front elevation view of the heat exchanger of FIG. 20;

FIG. 22 is a side elevation view of the heat exchanger of FIG. 20;

FIG. 23 is a bottom plan view of the heat exchanger of FIG. 20;

FIG. 25 is a front elevation view of the heat exchanger of FIG. 24;

DETAILED DESCRIPTION

Figure 1:
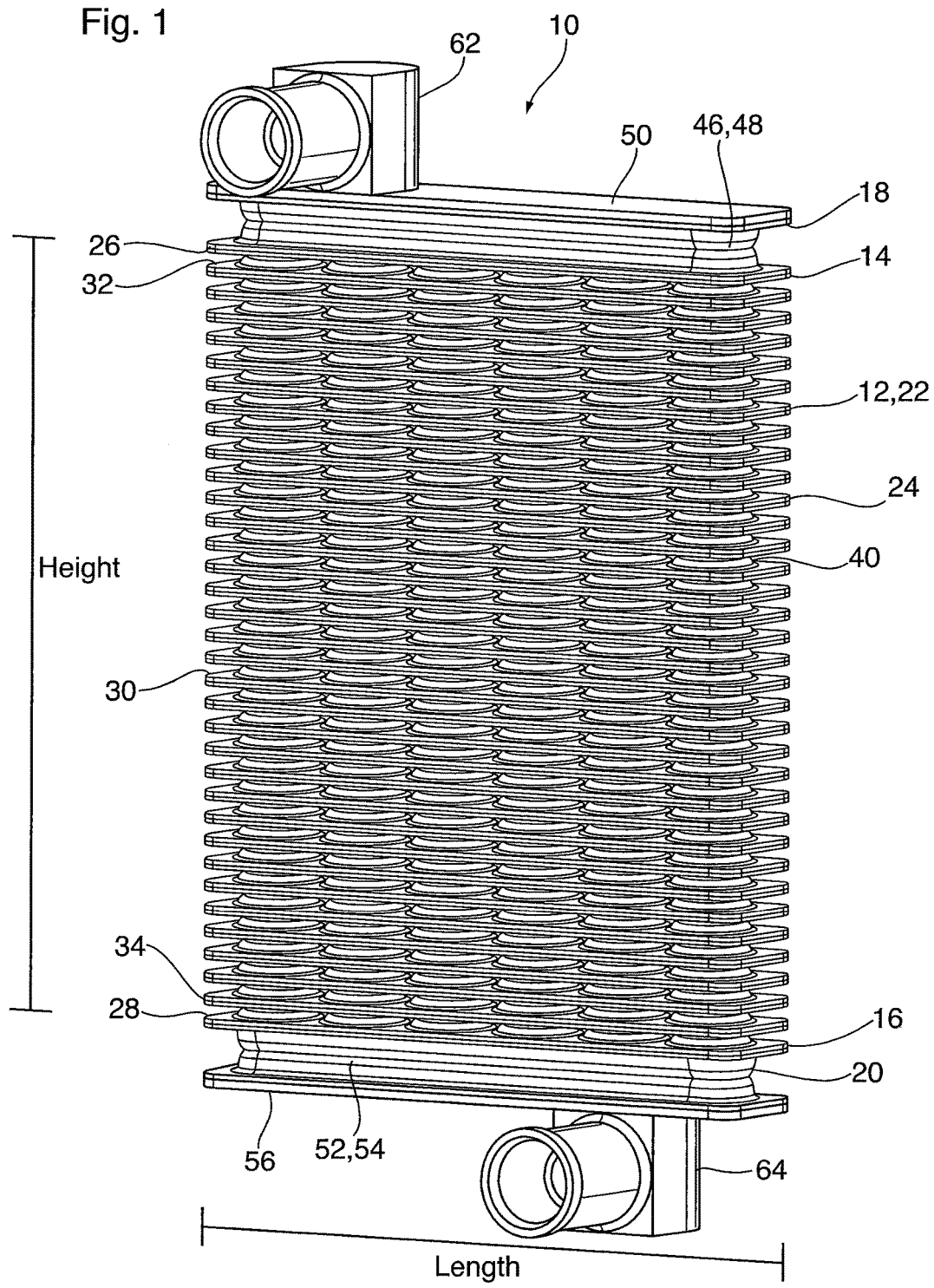
FIG. 1 is a perspective view of a heat exchanger according to a first embodiment.

A heat exchanger 10 according to a first embodiment is now described below with reference to FIGS. 1 to 6.

Heat exchanger 10 comprises a core 12 having a height, a length, and a top 14 and a bottom 16 between which the height is defined. Heat exchanger 10 further comprises a top manifold 18 provided on and sealed to the top 14 of core 12, and a bottom manifold 20 provided on and sealed to the bottom 16 of core 12.

Although terms such as "top" and "bottom", "above", "below", "height", "length", "width", etc. are used throughout the description and claims, these terms are used for convenience only. It should not be inferred that the use of any of these terms requires any of the heat exchangers described herein to have a specific orientation in use.

The core 12 of heat exchanger 10 consists of a single core section 22 comprising a plate stack 24, a top plate 26 and a bottom plate 28. In the present embodiment, the terms "core 12" and "core section 22" are used synonymously. Also, the core section 22 is sometimes referred to herein as the "first core section 22", particularly in embodiments having a core 12 comprised of multiple core sections 22.

The plate stack 24 comprises a plurality of core plates 30, the plate stack 24 having a top and a bottom 32, 34. FIGS. 3 and 4 illustrate a type of core plate 30 which may be used in heat exchanger 10, and which may also be used in any of the other embodiments described herein. Each of the core plates 30 comprises a generally flat plate having a plurality of spaced apart, raised openings 36 provided along its length, and a flat area 38 surrounding the plurality of raised openings 36. Within plate stack 24, the raised openings 36 of adjacent core plates 30 are sealed together to define a plurality of tubular structures 40 extending between the top and bottom 32, 34 of plate stack 24. As can be seen from FIGS. 1 and 2, the plate stack 24 formed by core plates 30 is similar in structure to a tube-and-fin core structure, with the tubular structures 40 corresponding to cylindrical tubes, and the surrounding flat areas 38 corresponding to fins. Also, in the present embodiment, the top plate 26 and bottom plate 28 are identical to core plates 30.

Figure 2:
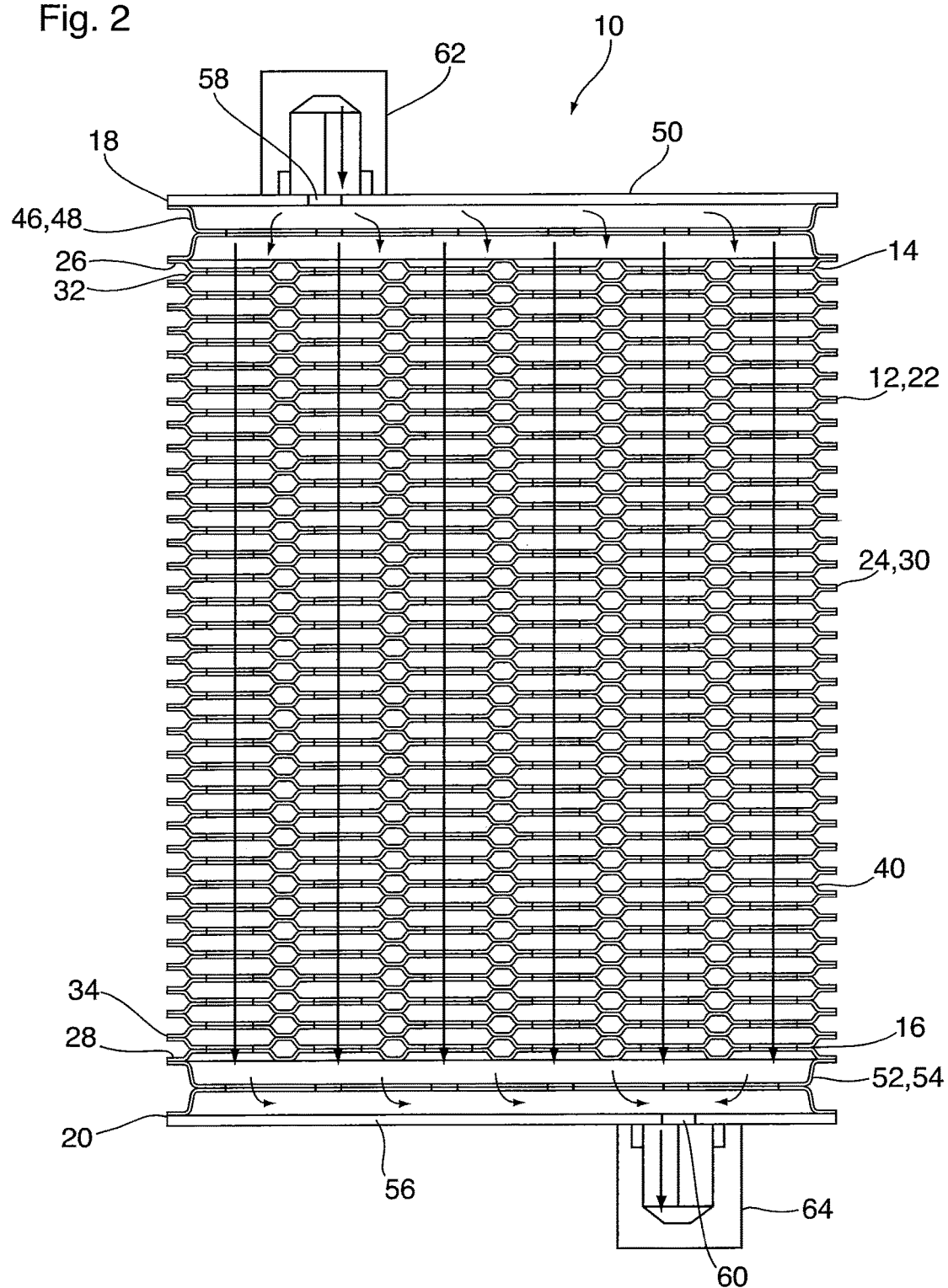
FIG. 2 is a front cross-sectional view of the heat exchanger of FIG. 1.

FIGS. 3 and 4 illustrate the specific structure of core plates 30, with FIG. 3 illustrating a single core plate 30 in isolation, and FIG. 4 showing how the plates 30 are stacked. As shown in these drawings, each of the raised openings 36 has a flat top sealing surface 42, and the flat areas 38 of the core plates 30 define an opposite flat bottom sealing surface 44. The core plates 30 are joined together with the flat top sealing surfaces 42 of the core plates 30 joined to the flat top sealing surfaces 42 of an adjacent core plate 30, and with the flat bottom sealing surface 44 of each core plate 30 joined to the flat bottom sealing surface 44 of an adjacent core plate 30. Accordingly, when the core plates 30 are joined together to form a stack as shown in FIGS. 1 and 2, the plate stack 24 consists of alternating layers of paired flat areas 38 and paired openings 36.

As can been seen from FIGS. 3 and 4, the core plates 30 of heat exchanger 10 are rectangular, having a pair of straight, parallel side edges and a pair of straight, parallel ends. Furthermore, the core plates 30 making up the plate stack 24 are identical to one another.

The top and bottom plates 26, 28 of plate stack 24 each have one or more openings 36 sealed to and communicating with the plurality of tubular structures 40. As mentioned above, the top and bottom plates 26, 28 of heat exchanger 10 are identical to one another and to the core plates 30. The top and bottom plates 26, 28 are oriented such that their flat bottom sealing surfaces 44 provide sealing flanges for sealing to one of the adjacent manifolds 18, 20.

The top manifold 18 comprises a top manifold tank section 46 having a hollow interior defining a top manifold tank space 48, wherein the top manifold tank space 48 is in flow communication with at least one of the tubular structures 40 of the core 12/core section 22. In the present embodiment, the top manifold 18 comprises a single tank section 46 which communicates with all of the tubular structures 40.

Figure 5:
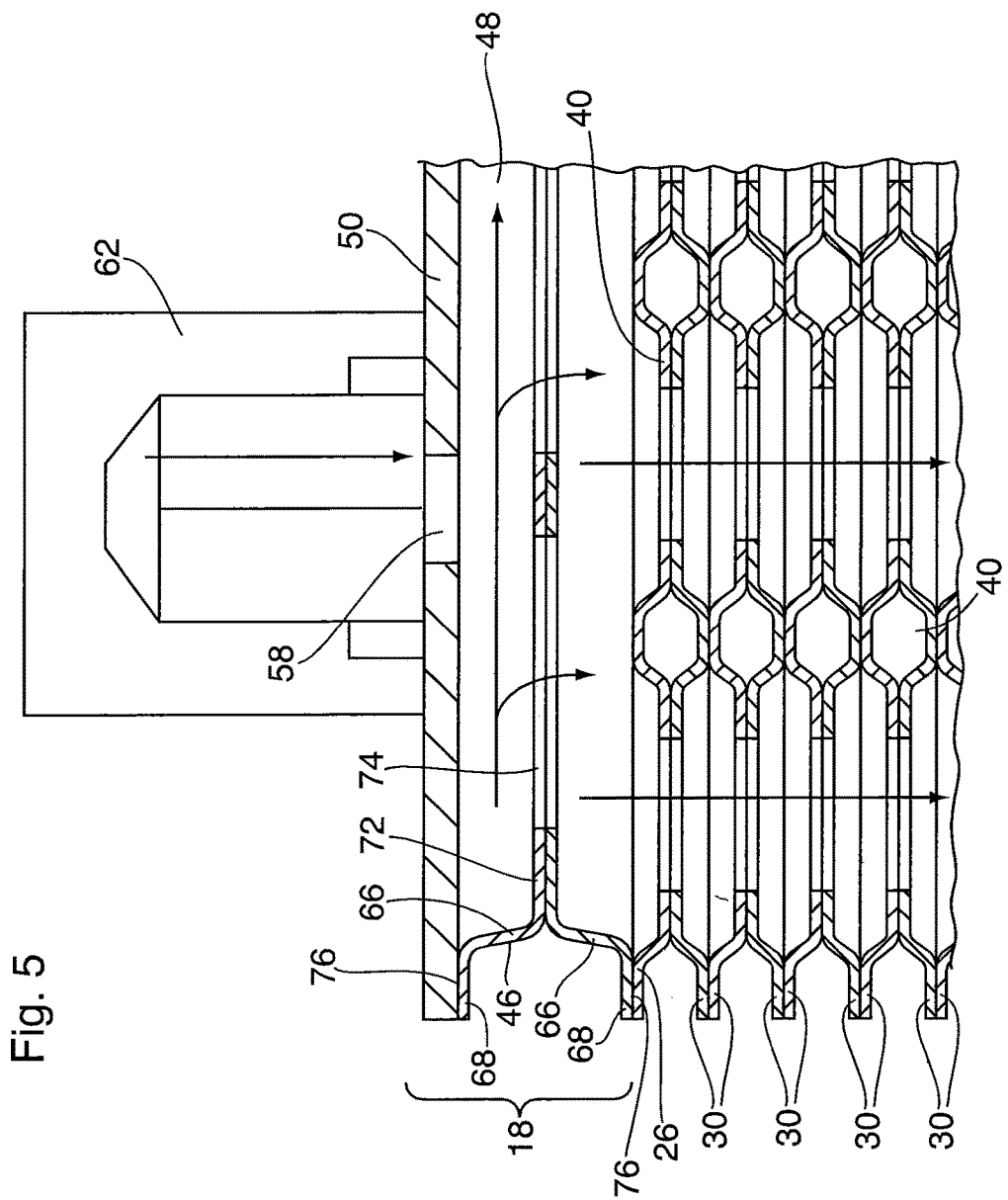
FIG. 5 is a partial, close-up front elevation view showing portions of a manifold and the core stack of the heat exchanger of FIG. 1.
Figure 6:
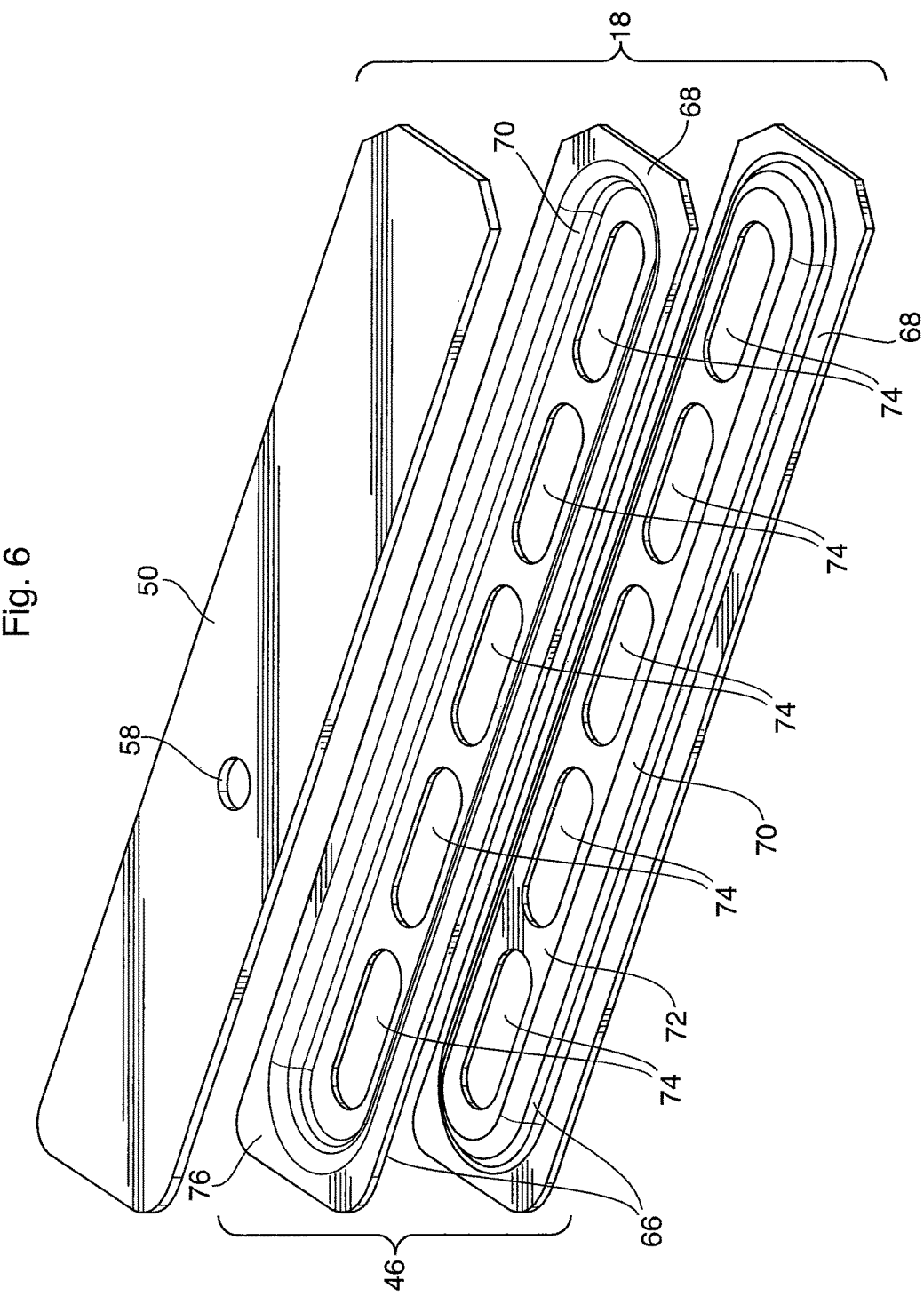
FIG. 6 is an exploded perspective view of the top manifold of the heat exchanger of FIG. 1.

As shown in the close-up of FIG. 5 and the exploded view of FIG. 6, the top manifold 18 further comprises a top manifold end plate 50 which is provided on the top manifold tank section 46 and sealed thereto so as to partly close and seal the top manifold tank space 48. As shown, the top manifold end plate 50 extends throughout the length of the core 12 at the top 14 thereof.

Similarly, the bottom manifold comprises a bottom manifold tank section 52 having an interior defining a bottom manifold tank space 54 which is in flow communication with at least one of the tubular structures 40 of core 12/core section 22. In the present embodiment, the bottom manifold tank space 54 is in flow communication with all of the tubular structures 40.

The bottom manifold 20 further comprises a bottom manifold end plate 56 provided on the bottom manifold tank section 52 and partly sealing the bottom manifold tank space 54, wherein the bottom manifold end plate 56 extends throughout the length of the core 12 at the bottom 16 thereof.

It can be seen from the drawings that the top and bottom manifold end plates 50, 56 are structural in nature and are typically thicker than core plates 30. These manifold end plates 50, 56 are flat plates, defining the top and bottom of heat exchanger 10. Furthermore, each of the manifold end plates 50, 56 in the present embodiment includes a fluid inlet or outlet opening 58, 60 with inlet or outlet fittings 62, 64 being sealingly connected to the manifold end plates 50, 56 for the purpose of connecting the inlet and outlet openings 58, 60 to other components of a coolant circulation system (not shown).

The tubular structures 40 define a plurality of fluid flow channels, which in the present embodiment extend throughout the height of core 12 and which are adapted to permit fluid flow in the same direction, i.e. from the inlet 58 and inlet fitting 62, through the top manifold 18, through the tubular structures 40 to the bottom manifold 20, and out through the fluid outlet 60 and outlet fitting 64. The path followed by fluid flowing through heat exchanger 10 is indicated by the arrows in FIG. 2.

Each of the manifold tank sections 46, 52 of heat exchanger 10 has an identical construction, and the components thereof are identified by identical reference numerals. As best seen in FIG. 6, the top manifold tank section 46 comprises a pair of stamped plates 66 which in the present embodiment are identical to one another. It will be appreciated that the bottom manifold tank section 52 will have a similar or identical construction. Each of the stamped plates 66 comprises a flat peripheral edge portion 68 surrounding a central raised portion 70 with a flat top sealing surface 72, the flat top sealing surface 72 surrounding at least one opening 74 provided in the central raised portion 70. In heat exchanger 10 there are five separate openings 74 in the flat top sealing surface 72, corresponding to the number of tubular structures 40, however, it will be appreciated that this is not essential. To form the manifold tank section 46 or 52, the flat top sealing surfaces 72 of a pair of stamped plates 66 are sealingly joined together to form a tank section 46, 52.

The flat peripheral edge portion 68 of each stamped plate 66 provides a flat bottom sealing surface 76 which is opposed to the flat top sealing surface 72 of the central raised portion 70. The manifold end plates 50, 56 each have flat surfaces which are sealingly joined to one of the flat bottom sealing surfaces 76 of the manifold tank section 46, 52. In the present embodiment, the other flat bottom sealing surface 76 of each manifold tank section 46, 52 is sealingly joined to the flat top sealing surface 42 or 44 of the top or bottom plate 26 or 28. As in heat exchanger 10, the top and bottom plates 26, 28 of heat exchanger 78 may be identical to one another and to the core plates 30, and are oriented such that their flat bottom sealing surfaces 44 provide sealing flanges for sealing to one of the adjacent manifolds 18, 20. Constructing the top and bottom manifold tank sections 46, 52 as described above helps to simplify construction by avoiding the need to form deep drawn header tanks of complex shape. The raised portions 70 of stamped plates 66 are relatively shallow and can be formed with simple tooling, even in embodiments where the manifold tank sections 46, 52 are non-linear.

A heat exchanger 78 according to a second embodiment is now described below with reference to FIGS. 7-10. Heat exchanger 78 includes a number of elements which are similar or identical to the elements of heat exchanger 10 described above. In the following description, like reference numerals are used to identify like elements, and the above description of like elements of heat exchanger 10 applies equally to the elements of heat exchanger 78, unless otherwise indicated.

Like heat exchanger 10, heat exchanger 78 includes a core 12 having a top 14 and a bottom 16, a top manifold 18 and bottom manifold 20. Unlike heat exchanger 10, the flow path followed by the fluid passing through heat exchanger 78 is U-shaped, and therefore the fluid inlet and outlet 58, 60 and the inlet and outlet fittings 62, 64 are provided on one of the manifolds 18 or 20. In the illustrated embodiment, the fittings 62, 64 and inlet and outlet 58, 60 are provided on the top manifold 18, however they may be instead be provided on the bottom manifold 20. Heat exchangers having this U-shaped flow configuration are commonly referred to as "two-pass" heat exchangers.

It can be seen that the core 12 of heat exchanger 78 is generally rectangular, but is non-planar. In the present embodiment, the core 12 comprises a core section 22, and the core section 22 comprises a first portion 80 and a second portion 82, both of which are rectangular and planar. As in the first embodiment, the terms "core 12" and "core section 22" are used synonymously in the description of the second embodiment.

Figure 7:
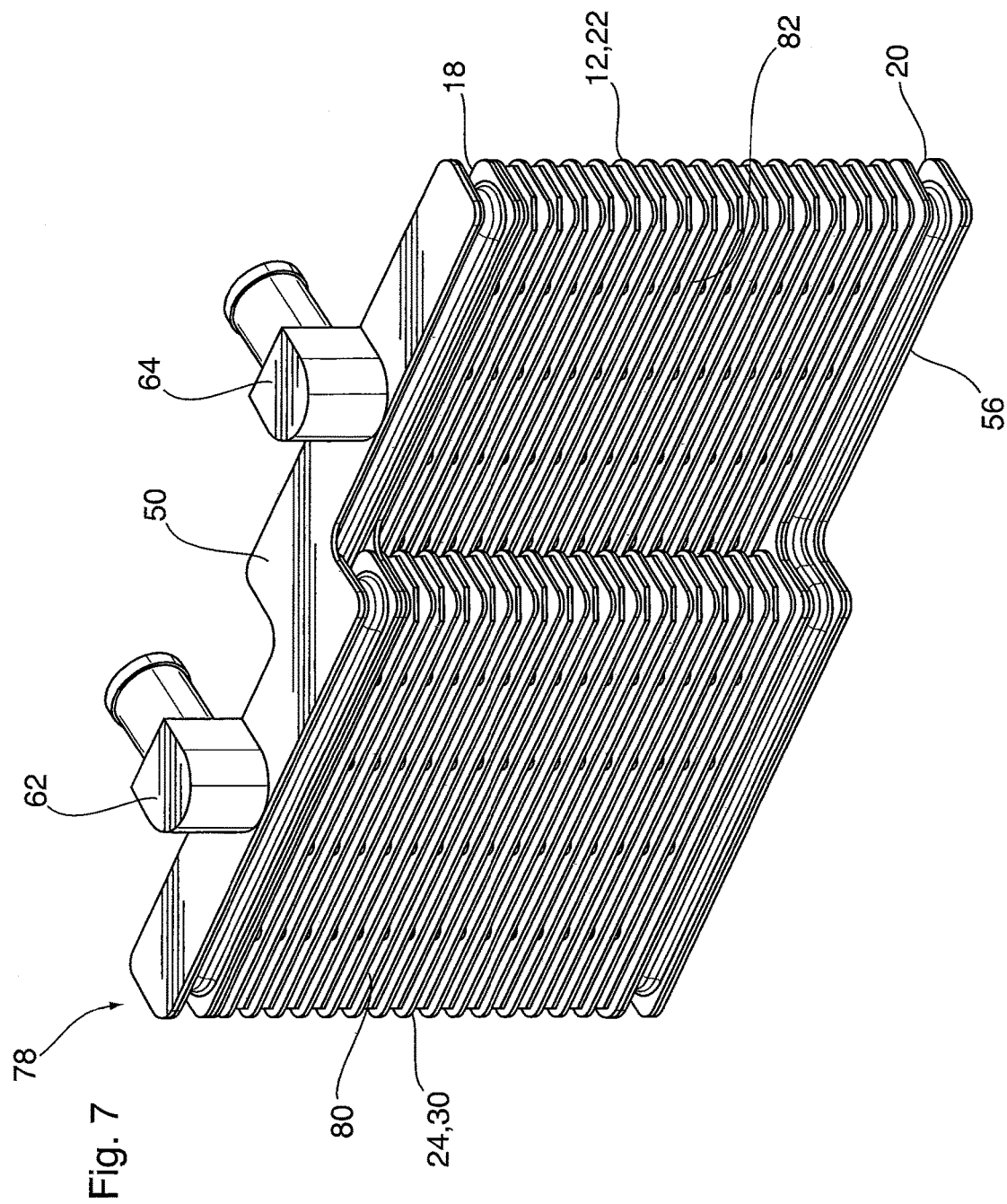
FIG. 7 is a perspective view of a heat exchanger according to a second embodiment.
Figure 11:
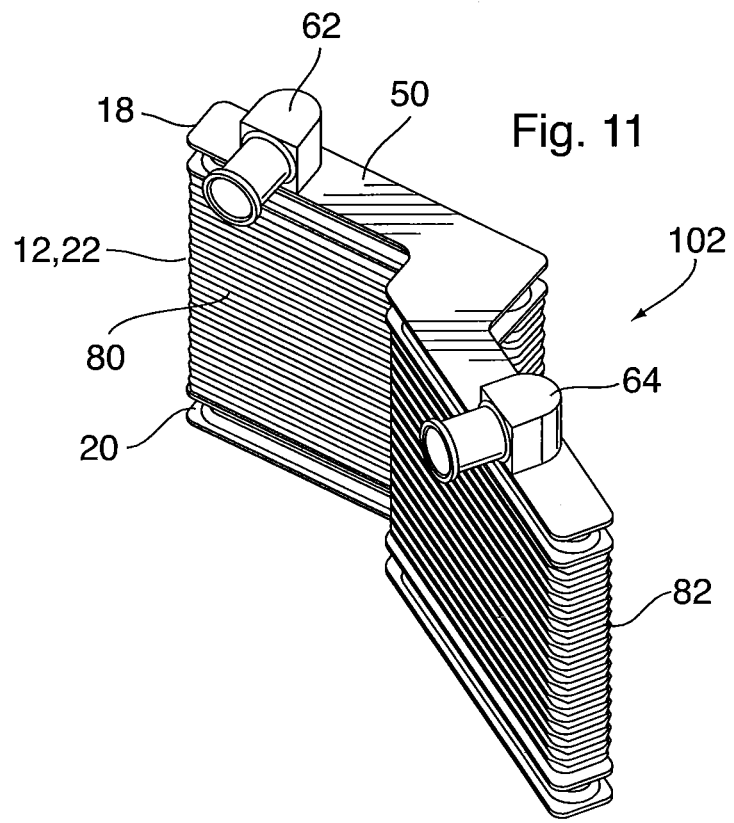
FIG. 11 is a top perspective view of a heat exchanger according to a third embodiment.
Figure 12:
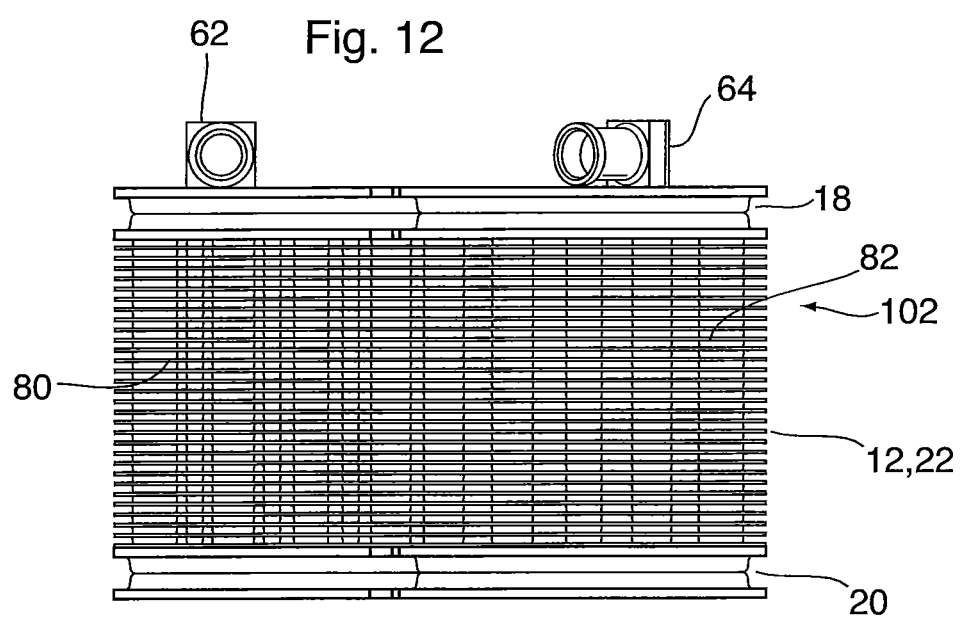
FIG. 12 is a front elevation view of the heat exchanger of FIG. 11.
Figure 13:
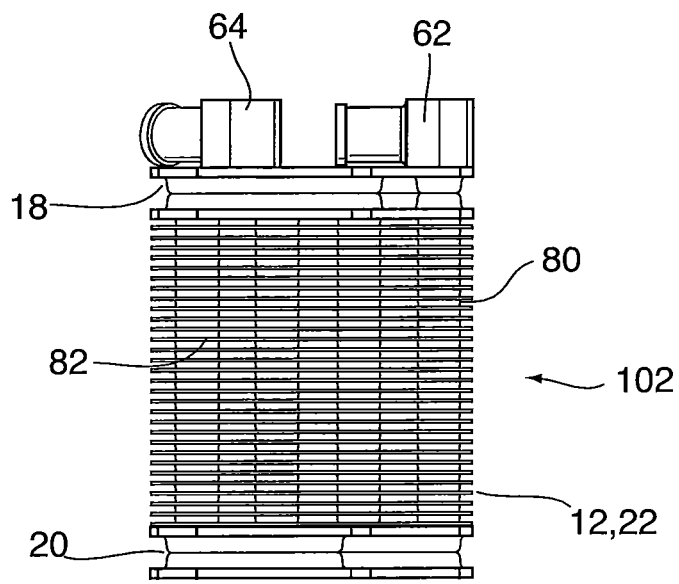
FIG. 13 is a side elevation view of the heat exchanger of FIG. 11.
Figure 14:
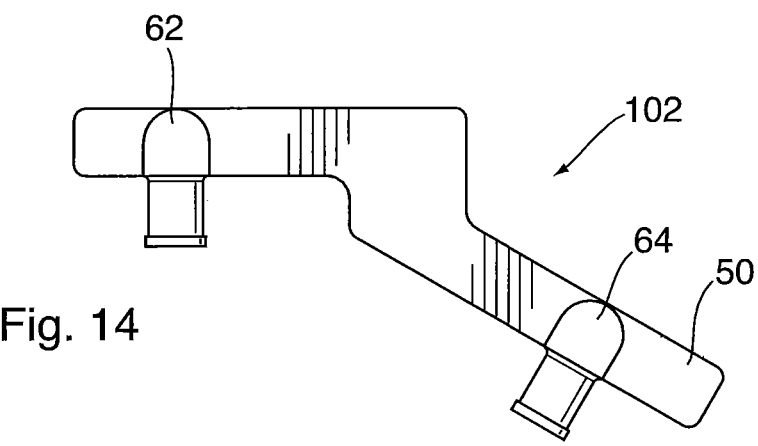
FIG. 14 is a top plan view of the heat exchanger of FIG. 11.
Figure 15:
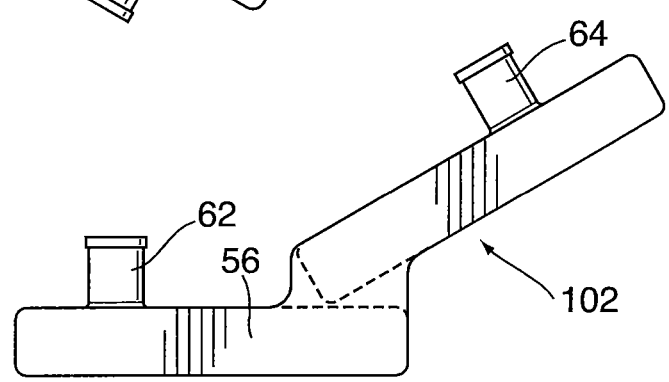
FIG. 15 is a bottom plan view of the heat exchanger of FIG. 11.
Figure 24:
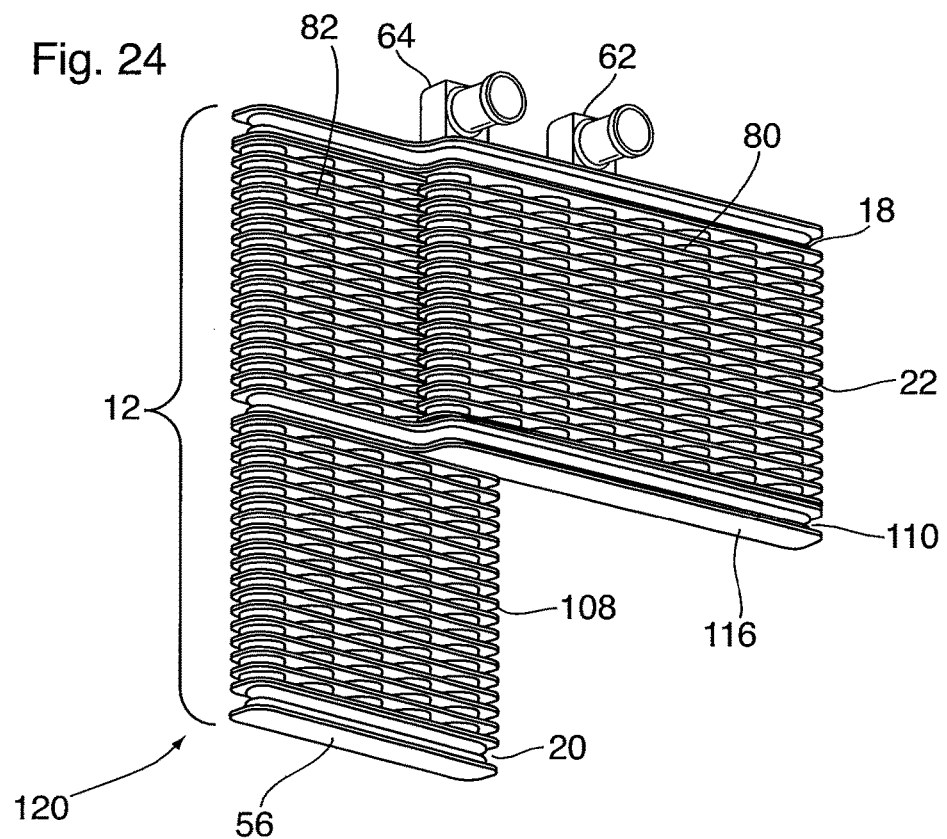
FIG. 24 is a bottom perspective view of a heat exchanger according to a sixth embodiment.
Figure 26:
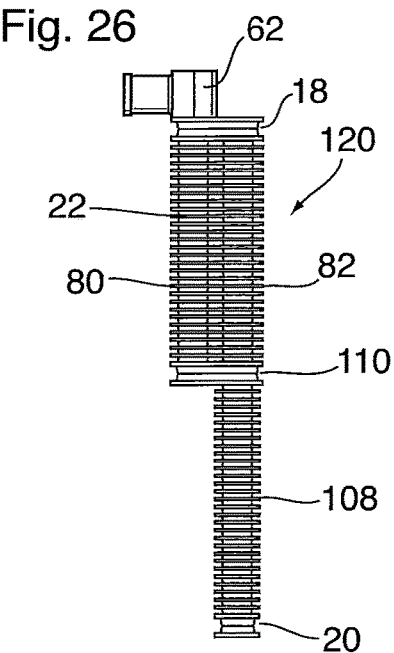
FIG. 26 is a side elevation view of the heat exchanger of FIG. 24.
Figure 27:
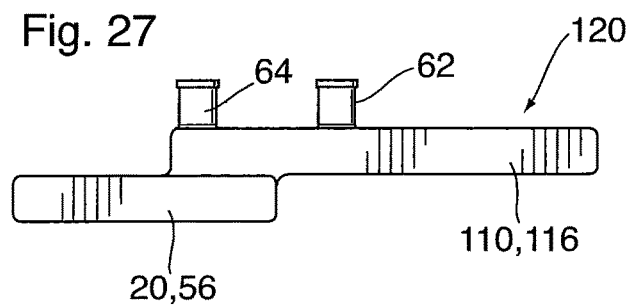
FIG. 27 is a bottom plan view of the heat exchanger of FIG. 24.

However, the first and second portions 80, 82 of core section 22 are non-planar in relation to one another, and are arranged in a "stepped" configuration, defined herein as a configuration in which the first and second portions of a core section 22 are both rectangular and planar, but are located in different planes which are parallel to one another. In addition, the first and second portions 80, 82 in the stepped configuration may have overlapping ends, as shown in FIG. 7. This stepped configuration is particularly useful where heat exchanger 78 must be enclosed in an irregularly shaped space, such as the interior of an oil pan. The stepped configuration of heat exchanger 78 permits one portion 80 or 82 of the core section 22 to be received in a shallow portion of the oil pan, while the other portion 80 or 82 may be received in the sump of the oil pan.

The stepped core 12 of heat exchanger 78 may be constructed from a single plate stack 24 or from two separate plate stacks 24. For example, the entire core 12 and core section 22 may comprise a single plate stack 24 in which each of the core plates 30 has a stepped shape, with edges following the configuration of the stepped core 12. In this case, the first and second portions 80, 82 of the core section 22 each form part of the same plate stack 24, and the core plates 30 in the plate stack 24 may be identical to one another.

Alternatively, the first portion 80 of the core section 22 may comprise a first plate stack 24, and the second portion 82 may comprise a second plate stack 24. In this case, the first and second plate stacks 24 are separate from one another, each comprising a stack of core plates 30. In this variation, which is consistent with the embodiment shown in FIGS. 7 to 10, the core plates 30 making up each of the plate stacks 24 of the first and second portions 80, 82 may have a simple rectangular shape, and may optionally be identical to one another, thereby minimizing the amount of special tooling needed to construct the heat exchanger 78.

In order to provide the two-pass configuration, the top manifold 18 of heat exchanger 78 (best seen in the exploded view of FIG. 8A) comprises first and second manifold tank sections, both identified by reference numeral 46, so as to create two separate top manifold tank spaces 48. The first manifold tank section 46 of top manifold 18 communicates with all of the tubular structures 40 of the first portion 80 of core section 22, whereas the second manifold tank section 46 of the top manifold 18 communicates with all of the tubular structures 40 of the second portion 82 of core section 22. As with the core plates 30, the top manifold tank sections 46 may optionally be joined together, or may be separate from one another. According to this configuration, one of the top manifold tank spaces 48 will comprise an inlet manifold space and the other top manifold tank space 48 will comprise an outlet manifold space, each communicating with an inlet or outlet opening 58, 60 and an inlet or outlet fitting 62, 64.

The bottom manifold 20 of heat exchanger 78 (best seen in the exploded view of FIG. 8B) includes a single manifold tank section 52 which communicates with all of the tubular structures 40 of the core section 22. Therefore, the bottom manifold 20 provides a manifold tank space 54 in which the fluid received from the tubular structures 40 of the first portion 80 changes direction and enters the tubular structures 40 of the second portion 82.

Therefore, as shown in FIG. 8A, the top manifold end plate 50 has a fluid inlet opening 58 in flow communication with the first manifold tank section 46 of the top manifold 18, and a fluid outlet opening 60 in flow communication with the second manifold tank section 46 of the top manifold 18. In contrast, the bottom manifold end plate 56, shown in FIG. 8B, is free of openings.

FIGS. 9 and 10 illustrate a type of core plate 30 which may be used in heat exchanger 78, and which may also be used in any of the other embodiments described herein. As in the core plates shown in FIGS. 3 and 4, the core plates 30 of FIGS. 9 and 10 each comprise a generally flat plate having a plurality of spaced apart, raised openings 36 provided along its length, and having a flat area 38 surrounding the plurality of raised openings 36. In order to form the plurality of tubular structures 40, the core plates 30 are stacked and the raised openings 36 of adjacent core plates 30 in the plate stack 24 are sealed together to define the tubular structures 40.

Core plates 30 of FIGS. 9 and 10 differ from those shown in FIGS. 3 and 4 in that the core plates 30 of each plate stack 24 are joined together with the raised openings 36 facing in the same direction. To provide sealing, the raised openings 36 have sloped side walls 84 such that the raised openings 36 of adjacent plates 30 nest with one another, as shown in FIG. 10. In this type of core plate 30, the sealing together of the raised openings 36 is provided between the sloped side walls 84 of adjacent openings 36. The raised openings 36 in the core plates 30 of FIGS. 9 and 10 may be formed by simply piercing the core plate 30 with a punch, rather than by stamping the core plate 30. The use of piercing to form raised openings 36 can result in less thinning of the material of core plate 30 in the vicinity of opening 36, as compared to a stamping operation, particularly at the ends of the core plate 30. In addition, the use of pierced openings 36 with nestable, sloped sidewalls permits some adjustment of the spacing between adjacent core plates 30, simply by increasing or decreasing the amount of nesting. The use of piercing to form raised openings 36 results in openings 36 having a frusto-conical shape, without a flat top surface.

Each of the core plates 30 shown in FIGS. 9 and 10 may further comprises at least one raised protrusion 86 extending from the same side of plate 30 as raised openings 36 and having a height which is substantially the same as a desired spacing between the flat areas 38 of adjacent core plates 30. Each of the raised protrusions 86 is provided between an adjacent pair of raised openings 36. Thus, when the plates are stacked as in FIG. 10, a top 88 of each protrusion 86 will contact the flat area 38 of an adjacent core plate 36, thereby providing a stop, and ensuring consistent spacing between adjacent core plates. To improve contact with the flat areas 38 of the core plates 30, the tops 88 of protrusions 86 may be flat. In the present embodiment, the protrusions 86 are in the form of circular, flat-topped dimples provided between each pair of raised openings 36. However, it will be appreciated that the shape, spacing and number of protrusions 86 may vary from that shown in FIGS. 9 and 10. It will also be appreciated that protrusions 86 are not necessarily provided in all embodiments, and that it may be desired to provide core plates 30 without protrusions, for example, where it is desired to use the degree of nesting of openings 36 (in case of the core plate 30 of FIGS. 9 and 10) to provide some variability in the spacing between adjacent core plates 30.

The core plates 30 of FIGS. 9 and 10 include another feature which helps to minimize the number of unique parts used to construct heat exchanger 78. In this regard, each of the core plates 30 of FIGS. 9 and 10 has a central longitudinal axis A (shown in FIG. 9) along which the centers of the raised openings 36 are aligned. However, the centers of the raised protrusions 86 are offset relative to the central longitudinal axis A. Thus, when a plurality of identical core plates 30 of FIGS. 9 and 10 are assembled into a core stack, the plates 30 are rotated by 180 degrees such that the raised protrusions 86 in adjacent plates 30 will be axially offset relative to one another, and will not become nested. The offset of protrusions 86 is best seen in FIG. 8A, which shows top plates 26, being identical to core plates 30, and including centrally located raised openings 36 and offset protrusions 86. The offset of the protrusions 86 is sufficient to ensure that at least a portion of the top 88 of each raised protrusion 86 will be in contact with the flat area 38 of an adjacent core plate 30, thereby providing the desired spacing between the core plates 30.

In order to facilitate assembly of the plate stacks 24, the core plates 30 of FIGS. 9 and 10 may have visual indicators to distinguish one end of the core plate 30 from the other. In this regard, FIGS. 9 and 10 show that each core plate 30 is formed with a pair of opposed ends 90, 92, wherein end 92 is formed with cutoff corners 94. It can be seen in FIG. 10 that the ends 90, 92 alternate with one another in adjacent core plates 30 of the plate stack 24, and that the raised protrusions 86 are out of alignment with one another.

The top and bottom manifolds 18, 20 of heat exchanger 78 also have a somewhat different structure from the top and bottom manifolds 18, 20 of heat exchanger 10 described above. According to the present embodiment, the top and bottom manifolds 18, 20 include top and bottom manifold end plates 50, 56 which are in the form of flat plates extending along the length of core 12/core section 22. Both the top and bottom manifold end plates 50, 56 have a stepped configuration such that they follow the stepped shape of the core 12 and extend throughout the length of core 12, thereby providing structural rigidity to heat exchanger 78. This is particularly important where the first and second portions 80, 82 of the core section 22 comprise separate plate stacks 24.

In heat exchanger 78, the construction of each top manifold tank section 46 may be consistent with that of heat exchanger 10 described above, comprising stamped plates 66. Each of the first and second manifold tank sections 46 may comprise a single pair of stamped plates 66 having a stepped shape similar to that of manifold end plates 50, 56, or may comprise two separate stamped plates 66 as shown in FIG. 8A, each having a similar or identical shape to each other and to the stamped plates 66 of heat exchanger 10 described above.

As shown in FIG. 8A, the top manifold 18 of heat exchanger 78 further comprises a top stack end plate 96 having one face joined to the flat area 38 of the top plate 26 (identical to core plate 30 and with like elements identified with like reference numerals) of the first and second portions 80, 82 of the first core section 22, and an opposite face joined to the top manifold tank section 46. Similarly, as shown in FIG. 8B, the bottom manifold 20 of heat exchanger 78 further comprises a bottom stack end plate 98 having a first face joined to the flat area 38 of the bottom plate 28 (identical to core plate 30 and with like elements identified with like reference numerals) of core section 22 and an opposite second face joined to the bottom manifold tank section 52. In the present embodiment, the top and bottom stack end plates 96, 98 are flat and planar, and have a peripheral shape which is substantially identical to that of the top and bottom manifold end plates 50, 56. Furthermore, the thicknesses of the top and bottom stack end plates 96, 98 may be the same as the thicknesses of the top and bottom manifold end plates 50, 56, such that the top and bottom stack end plates 96, 98 also provide structural rigidity to the core 12 of heat exchanger 78.

The top stack end plate 96 is further provided with at least one opening 100 through which flow communication is provided between one or more of the tubular structures 40 of the core 12 and one of the manifold tank spaces 48 of the top manifold 18. In the present embodiment, the top stack end plate 96 includes a plurality of openings 100 consisting of simple holes equal in number to, and aligned with, the tubular structures 40 of core 12, and the raised openings 36 of top plates 26 and core plates 30.

The bottom stack end plate 98 is provided with at least one opening 101 through which flow communication is provided between one or more of the tubular structures 40 of the core 12 and one of the manifold tank space 54 of the bottom manifold 20. In the present embodiment, the bottom stack end plate 98 includes a plurality of openings 101 equal in number and aligning with the tubular structures 40 of core 12, and with the raised openings 36 of bottom plates 28 and core plates 30. In the present embodiment, using core plates 30 as shown in FIGS. 9 and 10, the openings 101 in the bottom stack end plate 98 are in the form of raised openings which face in the same direction as the raised openings 36 of the bottom plates 28, thereby providing a degree of nesting so as to assist in sealing plates 28 and 98 together. As such, the bottom stack end plate 98 may have a thickness less than that of the top stack end plate 96 which is formed with openings 100 in the form of simple holes. However, in embodiments using the plates 30 shown in FIGS. 3 and 4, the openings 100, 101 in both the top and bottom stack end plates 96, 98 may be simple holes, in which case the top and bottom stack end plates 96, 98 may be identical to one another.

A heat exchanger 102 in accordance with a third embodiment is now described with reference to FIGS. 11-15. Heat exchanger 102 includes a number of elements which are similar or identical to the elements of heat exchangers 10 and 78 described above. In the following description, like reference numerals are used to identify like elements, and the above description of like elements of heat exchangers 10 and 78 applies equally to the elements of heat exchanger 102, unless otherwise indicated.

The heat exchanger 102 according to the third embodiment includes a core 12 having a top 14 and a bottom 16, a top manifold 18 and a bottom manifold 20. The core 12 comprises a core section 22 which is comprised of a first portion 80 and a second portion 82. In the present embodiment, the first and second portions 80, 82 of core 12 and first core section 22 are non-planar in relation to one another. Each of the first and second portions 80, 82 of the first core section 22 are rectangular and planar, and are angled relative to one another so as to provide the core 12/core section 22 with an angled configuration, wherein an included angle between the first and second portions 80, 82 of core 12 is greater than 90 degrees, i.e. about 150 degrees. As in the embodiments described above, the terms "core 12" and "core section 22" are used synonymously in the description of the third embodiment.

In heat exchanger 102, the first portion 80 of core section 22 comprises a first plate stack 24 and the second portion 82 of the core section 22 comprises a second plate stack 24. As can be seen from the drawings, the first and second plate stacks 24 are separate from one another, each comprising a stack of core plates 30 which are rectangular in shape, and may comprise the core plates shown in FIGS. 3-4 or in FIGS. 9-10. The core plates 30 of the two plate stacks 24 may be identical to one another.

The heat exchanger 102 is similar to heat exchanger 78 in that it has a two-pass configuration, wherein the top manifold 18 has a pair of top manifold tank sections 46, one of the top manifold tank sections 46 being in flow communication with the tubular structures 40 of the first portion 80 of core section 22, while the other top manifold tank section 46 is in flow communication with all of the tubular structures in the second portion 82 of core section 22. The bottom manifold 20, on the other hand, includes a single manifold tank section 52 which communicates with all of the tubular structures 40 of the first core section 22. The bottom manifold tank section 52 may therefore be comprised of a pair of stamped plates 66 which follow the shape of the core 12 and the manifold end plates 50, 56. Aside from the angled orientation and shapes of the manifolds 18, 20 of heat exchanger 102, it will be appreciated that will otherwise be structurally similar to the top and bottom manifolds 18, 20 illustrated in FIGS. 8A and 8B.

Rather than providing two separate plate stacks 24 of identical configuration, it will be appreciated that the first and second portions 80, 82 of the first core section 22 may form part of the same plate stack 24 such that the core plates 30 have edges which follow the angled configuration of the first core section 22, and are of generally the same shape as the top and bottom manifold end plates 50, 56. In this configuration, all of the core plates 30 comprising the single plate stack 24 may be identical to one another.

It will be appreciated that the angle between the first and second portions 80, 82 of first core section 22 in heat exchanger 102 may be altered from that shown in FIGS. 11-15 by merely changing the shapes of the plates making up the manifolds 18, 20. The included angle between the first and second portions 80, 82 of first core section 22 can thus be varied from less than or equal to 90 degrees to greater than 90 degrees, or vice versa.

A heat exchanger 104 according to a fourth embodiment is now described below with reference to FIGS. 16-19. Heat exchanger 104 comprises a core 12 having a top 14 and a bottom 16, a top manifold 18 and a bottom manifold 20. The core 12 comprises a first core section 22 which is non-planar, and in which the first portion 80 and the second portion 82 are non-planar in relation to one another. According to this embodiment, the first core section 22 is curved, such that the plate stack 24 includes a plurality of core plates 30 having curved edges. As in the first to third embodiments, the terms "core 12" and "first core section 22" are used synonymously in the description of the fourth embodiment. Aside from the curved orientation and shapes of the manifolds 18, 20 of heat exchanger 104, it will be appreciated that will otherwise be structurally similar to the top and bottom manifolds 18, 20 illustrated in FIGS. 8A and 8B.

A heat exchanger 106 according to a fifth embodiment is now described below with reference to FIGS. 20-23. Heat exchanger 106 includes a number of elements which are similar or identical to the elements of heat exchangers 10, 78 and 102 described above. In the following description, like reference numerals are used to identify like elements, and the above description of like elements of heat exchangers 10, 78 and 102 applies equally to the elements of heat exchanger 106, unless otherwise indicated.

Heat exchanger 106 comprises a core 12 having a top 14 and a bottom 16, a top manifold 18 and a bottom manifold 20. The core 12 of heat exchanger 106 is generally L-shaped, so as to permit the heat exchanger 106 to be inserted into an irregularly shaped fluid reservoir.

To provide this L-shape, the heat exchanger 106 is comprised of a first core section 22 and a second core section 108. The second core section 108 is provided below the first core section 22, with the top manifold 18 being provided on top of the first core section 22 and the bottom manifold 20 being provided on the bottom of the second core section 108. The L-shape of the core is provided by constructing one of the core sections 22 or 108 to be longer than the other core section 22 or 108. In the present embodiment, the first core section 22 is longer than the second core section 108, and the top manifold 18 is also longer than the bottom manifold 20.

Each of the first and second core sections 22, 108 of heat exchanger 106 are rectangular and planar, and the first and second core sections 22, 108 are co-planar in relation to one another. The core sections 22, 108 each comprise a plate stack 24 comprising a plurality of core plates 30, and the top and bottom plates 26, 28 of each core section are identical to the core plates 30.

In the present case, the core plates 30 making up each plate stack 24 are comprised of a stack of plates 30 in accordance with FIGS. 9 and 10, in which the raised openings 36 of adjacent plates nest with one another and raised protrusions 86 are provided between the raised openings 36. As can be seen from the front elevation of FIG. 21, the first core section 22 is comprised of core plates 30 having a total of eight raised openings 36 so as to form eight tubular structures 40 extending throughout the height of the first core section 22. The second core section 108, on the other hand, is comprised of a plate stack 24 made up of core plates 30 having a total of five raised openings 36, forming five tubular structures 40 extending throughout the height of the second core section 108.

In the present embodiment, where the heat exchanger 106 is formed from two core sections 22, 108, the top manifold 18 and bottom manifold 20 are provided on different manifold sections. Heat exchanger 108 further comprises a third manifold, referred to herein as an intermediate manifold 110, which is provided between the first and second core sections 22, 108, and is sealed to the bottom of the first core section 22 and the top of the second core section 108. As with the top and bottom manifolds 18, 20, the intermediate manifold 110 comprises at least one intermediate manifold tank section 112 having an interior defining an intermediate manifold tank space 114. The intermediate manifold tank space of each tank section is in flow communication with at least one of the tubular structures 40 of at least one of the core sections 22, 108.

In the illustrated embodiment, both the top manifold 18 and the intermediate manifold 110 are structurally similar to one another, and each have two manifold tank sections 46 or 112 having a structure as described above. A first top manifold tank section 46 and top manifold tank space 48 (on right hand side of FIG. 21) communicate with the four tubular structures 40 on the right side of heat exchanger 106 (also referred to herein as a first subset of tubular structures) as shown in FIG. 21, and the second top manifold tank section 46 and tank space 48 (on the left hand side of FIG. 21) are in flow communication with the four tubular structures 40 of first core section 22 on the left side of FIG. 21 (also referred to herein as the second subset of tubular structures. Similarly, a first intermediate manifold tank section 112 and corresponding tank space 114 (on the right hand side of FIG. 21) are in flow communication with the first subset of tubular structures 40 of the first core section 22, and the second intermediate manifold tank section 112 and corresponding tank space 114 (on the left hand side of FIG. 21) are in flow communication with the second subset of tubular structures 40 of the first core section 22.

Further, it can be seen from FIG. 21 that the first manifold tank section 112 of intermediate manifold 110 is in communication with a first subset of the tubular structures 40 of the second core section 108. In this embodiment, the first subset of tubular structures 40 in second core section 108 corresponds to the tubular structure 40 at the right end of second core section 108 in FIG. 21. Therefore, all of the fluid flowing through the four right-hand tubular structures 40 of core section 22 is collected in the first manifold section 112 of the intermediate manifold 110, and flows into the tubular structure 40 at the right end of second core section 108.

The second manifold tank section 112 of the intermediate manifold 110 communicates with a second subset of tubular structures 40 of the second core section 108, corresponding to the four tubular structures 40 on the left side of second core section 108. Therefore, the second subset of tubular structures 40 of the first core section 22 is in flow communication with the second subset of tubular structures of the second core section 108 through the second manifold tank section 112 of intermediate manifold 110.

In terms of overall structure, the top manifold 18 of heat exchanger 106 is similar to that shown in FIG. 8A, relating to heat exchanger 78. In this regard, the top manifold 18 of heat exchanger 106 has a top manifold end plate 50 which is shown in FIG. 20A, having an overall rectangular shape and including fluid inlet and outlet openings 58, 60. The top manifold tank section 46 is comprised of stamped plates 66, as shown in FIG. 20A. However, rather than being separate plates 66 as in FIG. 8A, adjacent stamped plates 66 in FIG. 20A are joined together end-to-end and are identified as 66A and 66B. The top manifold of heat exchanger 106 also includes a top stack end plate 96 which is structurally similar to that shown in FIG. 8A, having openings 100 in the form of simple holes and with a thickness greater than that of the core plates 30.

In order to provide the L-shaped core 12 of heat exchanger 106 with structural rigidity, the intermediate manifold 110 further comprises an intermediate manifold support plate 116 (shown in FIG. 20A) which partly seals the intermediate manifold tank space 114 of both the first and second manifold tank sections 112. As shown, the intermediate manifold support plate 116 extends throughout the length of the intermediate manifold 110, having four openings 100 (the first four openings from the left end of plate 116) which permit flow communication between the second subset of tubular structures 40 of the first core section 22 and the second subset of tubular structures 40 of the second core section 108. The support plate 116 also includes an opening 100 (the far right opening 100 in plate 116) which provides flow communication between the first subset of tubular structures 40 of the first core section 22 and the first subset of tubular structures 40 of the second core section 108.

The intermediate manifold 110 further comprises an intermediate manifold end plate 118 which may also be a structural member, and which may have the same shape as the intermediate manifold support plate 116. In this embodiment, the end plate 118 is structurally similar to the bottom stack end plate 98 shown in FIG. 8B, having raised openings 101 to mate with raised openings of bottom plates 28 of core section 22. End plate 118 may instead be provided with openings 100 in the form of simple holes where the core plates 30 and bottom plates 28 have the structure shown in FIGS. 3 and 4.

The bottom manifold 20 of heat exchanger 106 is shorter than the top and intermediate manifolds, and includes a single manifold tank section 52 and corresponding tank space 54, so as to permit the fluid to change direction, as shown in FIG. 21. Aside from having a different shape from the bottom manifold 20 of heat exchanger 78, the bottom manifold 20 of heat exchanger 106 may be otherwise structurally similar or identical to the bottom manifold 20 shown in FIG. 8B.

The top manifold end plate 50 has a fluid inlet opening 58 in flow communication with the first manifold tank section 46 of the top manifold 18, and a fluid outlet opening in flow communication with the second manifold tank section 46 of the top manifold 18. According to this configuration, the heat exchanger 106 comprises a first plurality of fluid flow passages which are defined by the first subsets of tubular structures 40 of the first and second core sections 22, 108, the first plurality of fluid flow passages being adapted to permit fluid flow in the same direction from the fluid inlet opening 58 to the bottom manifold 20, wherein the fluid flow path through heat exchanger 106 is indicated by arrows in FIG. 21. A second plurality of fluid flow passages is defined by the second subsets of tubular structures 40 of the first and second core sections 22, 108, the second plurality of fluid flow passages being adapted to permit fluid flow in the same direction (i.e. the upward direction in FIG. 21) from the bottom manifold 20 to the fluid outlet opening 60.

A heat exchanger 120 according to a sixth embodiment is now described below with reference to FIGS. 24-27. Heat exchanger 120 includes a number of elements which are similar or identical to the elements of heat exchangers 10, 78, 102 and 106 described above. In the following description, like reference numerals are used to identify like elements, and the above description of like elements of heat exchangers 10, 78, 102 and 106 applies equally to the elements of heat exchanger 120, unless otherwise indicated.

Heat exchanger 120 is similar to heat exchanger 106 described above in that the core has a L-shape and the overall flow configuration through heat exchanger 120 is U-shaped. As with heat exchanger 106, the heat exchanger 120 comprises a first core section 22 which is provided on top of a second core section 108. The most significant difference between heat exchangers 106 and 120 is that the first core section 22 of heat exchanger 120 is non-planar, and comprises a first portion 80 and a second portion 82. In the illustrated embodiment, the second portion 82 of the first core section 22 and the second core section 108 lie in a common plane, whereas the first portion 80 of the first core section 22 lies in a different plane. More specifically, the first core section 22 has a stepped configuration, with the first and second portions 80, 82 of the first core section 22 being parallel and having overlapping ends, and with the top manifold end plate 50 and intermediate manifold support plate 116 having edges which follow the stepped configuration of the first core section 22. The plate stacks 24 comprising the first and second core sections 22, 108 of heat exchanger 120 are as described above with reference to FIGS. 3-4 and 9-10, and in the present embodiment comprise core plates 30 as shown in FIGS. 9 and 10. The first and second portions 80, 82 of the first core section 22 may either comprise separate plate stacks 24, or the first and second portions 80, 82 of the first core section 22 may comprise a single plate stack 24, as described above. Where the first and second portions 80, 82 of the first core section 22 are comprised of separate plate stacks 24, one or both of them may be identical to one another and/or to the core plates 30 of the second core section 108.

Although the invention has been described in connection with certain embodiments, it is not limited thereto. Rather, the invention includes all embodiments which may fall within the scope of the following claims.

What is claimed is:

1. A heat exchanger comprising:
   (a) a core having a height, a length, and a top and a bottom between which the height is defined, wherein said core comprises at least one core section having a top, a bottom and a length, and wherein each said core section comprises:
      (i) a plate stack comprising a plurality of core plates, wherein the plate stack has a top and a bottom, and wherein each of the core plates comprises a generally flat plate having a plurality of spaced apart, raised openings provided along its length, and a flat area surrounding said plurality of raised openings, wherein the raised openings of adjacent core plates in said plate stack are sealed together to define a plurality of tubular structures extending between the top and the bottom of the plate stack;
      (ii) a top plate sealed to the top of the plate stack, the top plate having one or more openings communicating with the plurality of tubular structures; and
      (iii) a bottom plate sealed to the bottom of the plate stack, the bottom plate having one or more openings communicating with the plurality of tubular structures;
   (b) a top manifold provided on and sealed to the top of the core, wherein the top manifold comprises:
      (i) at least one top manifold tank section having an interior defining a top manifold tank space, wherein the top manifold tank space of each said top manifold tank section is in flow communication with at least one of the tubular structures of one of the at least one core section; and
      (ii) a top manifold end plate provided on the top manifold tank section and at least partly sealing the top manifold tank space, wherein the top manifold end plate extends throughout the length of the core at the top thereof; and
   (c) a bottom manifold provided on and sealed to the bottom of the core, wherein the bottom manifold comprises:
      (i) at least one bottom manifold tank section having an interior defining a bottom manifold tank space, wherein the bottom manifold tank space of each said at least one bottom manifold tank section is in flow communication with at least one of the tubular structures of one of the at least one core section; and
      (ii) a bottom manifold end plate provided on each said at least one bottom manifold tank section and at least partly sealing the bottom manifold tank space, wherein the bottom manifold end plate extends throughout the length of the core at the bottom thereof;
   wherein each of the manifold tank sections comprises first and second stamped plates, wherein the first and second stamped plates each comprise a flat peripheral edge portion with a flat bottom sealing surface and a central raised portion with a flat top sealing surface, and wherein the flat top sealing surface surrounds at least one opening provided in the central raised portion;
wherein the flat top sealing surfaces of the first and second stamped plates are sealingly joined together to form said manifold tank section; and
wherein one of the flat bottom sealing surfaces is sealingly joined to a flat surface of one of the manifold end plates.

2. The heat exchanger of claim 1, wherein the at least one core section comprises a first core section, wherein the first core section is rectangular and planar, wherein the core plates are rectangular;
wherein both the top and bottom manifold each include one said manifold tank section, wherein the manifold tank space communicates with all of said tubular structures of the first core section; and
wherein the top and bottom manifold end plates are flat plates, each having a fluid inlet or outlet opening.

3. The heat exchanger of claim 1, wherein the plurality of tubular structures defines a plurality of fluid flow channels, all of which extend throughout the height of the core and which are adapted to permit fluid flow in the same direction.

4. The heat exchanger of claim 1, wherein the at least one core section comprises a first core section which is non-planar; and
wherein the first core section comprises a first portion and a second portion which are non-planar in relation to one another.

5. The heat exchanger of claim 4, wherein the top manifold includes a first one of said manifold tank sections and a second one of said manifold tank sections;
wherein the first manifold tank section of the top manifold communicates with all of the tubular structures of the first portion of the first core section;
wherein the second manifold tank section of the top manifold communicates with all of the tubular structures of the second portion of the first core section;
wherein the bottom manifold includes a manifold tank section which communicates with all of the tubular structures of the first core section;
wherein the top and bottom manifold end plates are flat plates; and
wherein the top manifold end plate has a fluid inlet opening in flow communication with the first manifold tank section of the top manifold, and a fluid outlet opening in flow communication with the second manifold tank section of the top manifold.

6. The heat exchanger of claim 1, wherein the at least one core section comprises a first core section which is curved, and the plate stack includes a plurality of said core plates having curved edges.

7. The heat exchanger of claim 1, wherein the first core section comprises a first portion and a second portion which are non-planar in relation to one another;
wherein the first and second portions of the first core section are rectangular and planar; and
wherein the first core section has a stepped configuration, with the first and second portions of the first core section being parallel and having overlapping ends.

8. The heat exchanger of claim 7, wherein the core plates of the plate stack comprising the first core section have edges which follow the configuration of the first core section, such that the first and second portions of the first core section each form part of the same plate stack, and wherein the core plates comprising the plate stack are identical to one another.

9. The heat exchanger of claim 7, wherein the first portion of the first core section comprises a first plate stack, and the second portion of the first core section comprises a second plate stack; and
wherein the first and second plate stacks are separate from one another, and each comprise a stack of said core plates.

10. The heat exchanger of claim 9, wherein the core plates making up the plate stacks of the first and second portions are rectangular and identical.

11. The heat exchanger of claim 1, wherein the first core section comprises a first portion and a second portion which are non-planar in relation to one another;
wherein the first and second portions of the first core section are rectangular and planar; and
wherein the first core section has an angled configuration, with the first and second portions of the first core section being angled relative to one another.

12. The heat exchanger of claim 1, wherein the at least one core section comprises a first core section and a second core section, wherein the second core section is provided below the first core section, with the top manifold provided on the top of the first core section and the bottom manifold provided on the bottom of the second core section;
wherein the heat exchanger further comprises an intermediate manifold located between the bottom of the first core section and the top of the second core section; and
wherein the intermediate manifold is sealed to the bottom of the first core section and the top of the second core section, and comprises:
(i) at least one intermediate manifold tank section having an interior defining an intermediate manifold tank space, wherein the intermediate manifold tank space of each said intermediate manifold tank section is in flow communication with at least one of the tubular structures of the at least one of the core sections.

13. The heat exchanger of claim 12, wherein each of the top manifold and the intermediate manifold includes a first manifold tank section and a second manifold tank section; and
wherein the first manifold tank sections of the top and intermediate manifolds communicate with a first subset of said tubular structures of the first core section, and the second manifold tank sections of the top and intermediate manifolds communicate with a second subset of said tubular structures of the first core section.

14. The heat exchanger of claim 13, wherein the first manifold tank section of the intermediate manifold communicates with a first subset of said tubular structures of the second core section, such that the first subset of tubular structures of the first core section is in flow communication with the first subset of tubular structures of the second core section; and
wherein the second manifold tank section of the intermediate manifold communicates with a second subset of said tubular structures of the second core section, such that the second subset of tubular structures of the first core section is in flow communication with the second subset of tubular structures of the second core section.

15. The heat exchanger of claim 14, wherein the top and bottom manifold end plates are flat plates;
wherein the top manifold end plate has a fluid inlet opening in flow communication with the first manifold tank section of the top manifold, and a fluid outlet opening in flow communication with the second manifold tank section of the top manifold;
wherein a first plurality of fluid flow passages is defined by the first subset of tubular structures of the first and second core sections, the first plurality of fluid flow passages being adapted to permit fluid flow in the same direction from the fluid inlet opening to the bottom manifold; and
a second plurality of fluid flow passages is defined by the second subset of tubular structures of the first and second core sections, the second plurality of fluid flow passages being adapted to permit fluid flow in the same direction from the bottom manifold to the fluid outlet opening.

16. The heat exchanger of claim 12, wherein the first and second core sections are each rectangular and planar, and wherein the first and second core sections are co-planar in relation to one another.

17. The heat exchanger of claim 12, wherein the first core section is non-planar, and wherein a first portion of the first core section and the second core section lie in a common plane, whereas a second portion of the first core section lies in a different plane; and
wherein the first core section has a stepped configuration, with the first and second portions of the first core section being parallel and having overlapping ends, and with the top manifold end plate and the intermediate support plate having edges which follow the stepped configuration of the first core section.

18. The heat exchanger of claim 12, wherein the core plates of at least one of the first and second portions of the first core section are identical to the core plates of the second core section.

19. The heat exchanger of claim 1, wherein the top manifold further comprises a top stack end plate having a first face joined to the top plate and an opposite second face joined to the top manifold tank section;
wherein the top stack end plate is flat and planar, having a peripheral shape which is substantially identical to that of the top manifold end plate, and wherein the stack end plate has at least one opening through which flow communication is provided between one or more of the tubular structures of the core and the top manifold tank space;
wherein the bottom manifold further comprises a bottom stack end plate having a first face joined to the bottom plate and an opposite second face joined to the bottom manifold tank section; and
wherein the bottom stack end plate is flat and planar, having a peripheral shape which is substantially identical to that of the bottom manifold end plate, and wherein the bottom stack end plate has at least one opening through which flow communication is provided between one or more of the tubular structures of the core and the bottom manifold tank space.

20. The heat exchanger of claim 1, wherein the core plates of each said plate stack are joined together with the raised openings facing in the same direction, the raised openings have sloped side walls such that the raised openings of adjacent plates nest with one another.

21. The heat exchanger of claim 1, wherein each of the raised openings is formed by piercing the core plate, such that each of the raised openings has sloped side walls and a frusto-conical shape, without a flat top surface.

22. The heat exchanger of claim 21, wherein each of the core plates further comprises at least one raised protrusion having a height which is substantially the same as a desired spacing between the flat areas of adjacent core plates;
wherein each of the raised protrusions is provided between a pair of adjacent raised openings; and
wherein each of the raised protrusions has a top which is in contact with the flat area of an adjacent core plate.

23. The heat exchanger of claim 1, wherein each of the raised openings has a flat top sealing surface, wherein the flat areas of the core plates define an opposite flat bottom sealing surface, and wherein the core plates are joined together with the flat top sealing surfaces of each said core plate joined to the flat top sealing surfaces of an adjacent core plate, and with the flat bottom sealing surface of each said core plate joined to the flat bottom sealing surface of an adjacent core plate.

24. A heat exchanger comprising:
(a) a core having a height, a length, and a top and a bottom between which the height is defined, wherein said core comprises at least one core section having a top, a bottom and a length, and wherein each said core section comprises:
  (i) a plate stack comprising a plurality of core plates, wherein the plate stack has a top and a bottom, and wherein each of the core plates comprises a generally flat plate having a plurality of spaced apart, raised openings provided along its length, and a flat area surrounding said plurality of raised openings, wherein the raised openings of adjacent core plates in said plate stack are sealed together to define a plurality of tubular structures extending between the top and the bottom of the plate stack;
  (ii) a top plate sealed to the top of the plate stack, the top plate having one or more openings communicating with the plurality of tubular structures; and
  (iii) a bottom plate sealed to the bottom of the plate stack, the bottom plate having one or more openings communicating with the plurality of tubular structures;
(b) a top manifold provided on and sealed to the top of the core, wherein the top manifold comprises:
  (i) at least one top manifold tank section having an interior defining a top manifold tank space, wherein the top manifold tank space of each said top manifold tank section is in flow communication with at least one of the tubular structures of one of the at least one core section; and
  (ii) a top manifold end plate provided on the top manifold tank section and at least partly sealing the top manifold tank space, wherein the top manifold end plate extends throughout the length of the core at the top thereof; and
(c) a bottom manifold provided on and sealed to the bottom of the core, wherein the bottom manifold comprises:
  (i) at least one bottom manifold tank section having an interior defining a bottom manifold tank space, wherein the bottom manifold tank space of each said bottom manifold tank section is in flow communication with at least one of the tubular structures of one of the at least one core section; and
  (ii) a bottom manifold end plate provided on each said at least one bottom manifold tank section and at least partly sealing the bottom manifold tank space, wherein the bottom manifold end plate extends throughout the length of the core at the bottom thereof;

wherein the at least one core section comprises a first core section and a second core section, wherein the second core section is provided below the first core section, with the top manifold provided on the top of the first core section and the bottom manifold provided on the bottom of the second core section;

wherein the heat exchanger further comprises an intermediate manifold located between the bottom of the first core section and the top of the second core section; and wherein the intermediate manifold is sealed to the bottom of the first core section and the top of the second core section, and comprises:

(i) at least one intermediate manifold tank section having an interior defining an intermediate manifold tank space, wherein the intermediate manifold tank space of each said intermediate manifold tank section is in flow communication with at least one of the tubular structures of the at least one of the core sections;

wherein each of the top manifold and the intermediate manifold includes a first manifold tank section and a second manifold tank section; and wherein the first manifold tank sections of the top and intermediate manifolds communicate with a first subset of said tubular structures of the first core section, and the second manifold tank sections of the top and intermediate manifolds communicate with a second subset of said tubular structures of the first core section;

wherein the first manifold tank section of the intermediate manifold communicates with a first subset of said tubular structures of the second core section, such that the first subset of tubular structures of the first core section is in flow communication with the first subset of tubular structures of the second core section;

wherein the second manifold tank section of the intermediate manifold communicates with a second subset of said tubular structures of the second core section, such that the second subset of tubular structures of the first core section is in flow communication with the second subset of tubular structures of the second core section;

wherein the plate stack of the first core section and the second core section have different lengths, with the plate stack of the first core section being longer than the plate stack of the second core section;

wherein the intermediate manifold further comprises an intermediate manifold support plate partly sealing the intermediate manifold tank space of both the first and second manifold tank sections; and wherein the intermediate manifold support plate extends throughout the length of the intermediate manifold.

* * * * *